(12) United States Patent
Boyce et al.

(10) Patent No.: US 12,367,654 B2
(45) Date of Patent: Jul. 22, 2025

(54) PATCH BASED VIDEO CODING FOR MACHINES

(71) Applicant: INTEL CORPORATION, Santa Clara, CA (US)

(72) Inventors: Jill Boyce, Portland, OR (US); Palanivel Guruva Reddiar, Chandler, AZ (US); Praveen Prasad, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 338 days.

(21) Appl. No.: 17/795,178

(22) PCT Filed: Apr. 15, 2021

(86) PCT No.: PCT/US2021/027541
§ 371 (c)(1),
(2) Date: Jul. 25, 2022

(87) PCT Pub. No.: WO2021/211884
PCT Pub. Date: Oct. 21, 2021

(65) Prior Publication Data
US 2023/0067541 A1   Mar. 2, 2023

Related U.S. Application Data

(60) Provisional application No. 63/011,179, filed on Apr. 16, 2020.

(51) Int. Cl.
*G06V 10/25* (2022.01)
*G06T 3/40* (2024.01)
(Continued)

(52) U.S. Cl.
CPC ............... *G06V 10/25* (2022.01); *G06T 3/40* (2013.01); *G06V 20/40* (2022.01); *G06V 40/161* (2022.01)

(58) Field of Classification Search
CPC .... G06V 10/25; G06V 40/161; G06V 30/147; H04N 19/167; H04N 19/42; H04N 19/597; G06N 20/00; G06T 3/40
See application file for complete search history.

(56) References Cited

U.S. PATENT DOCUMENTS

| | | | |
|---|---|---|---|
| 8,369,633 B2 * | 2/2013 | Lu | H04N 19/136 382/239 |
| 10,776,926 B2 | 9/2020 | Shrivistava | |

(Continued)

FOREIGN PATENT DOCUMENTS

| | | |
|---|---|---|
| JP | 2006033793 A | 2/2006 |
| JP | 2014060512 A | 4/2014 |

(Continued)

OTHER PUBLICATIONS

Unterweger, Andreas, et al. "Building a post-compression region-of-interest encryption framework for existing video surveillance systems: Challenges, obstacles and practical concerns." Multimedia Systems 22 (2016): 617-639. (Year: 2016).*

(Continued)

*Primary Examiner* — Sumati Lefkowitz
*Assistant Examiner* — Connor L Hansen
(74) *Attorney, Agent, or Firm* — Essential Patents Group, LLP

(57) ABSTRACT

Devices and techniques related to implementing patch based video coding for machines are discussed. Such patch based video coding includes detecting regions of interest in a frame of video, extracting the detected regions of interest to one or more atlases absent the frame at a resolution not less than the resolution of the regions of interest, and encoding the one or more atlases to a bitstream.

22 Claims, 12 Drawing Sheets

(51) Int. Cl.
*G06V 20/40* (2022.01)
*G06V 40/16* (2022.01)

(56) References Cited

U.S. PATENT DOCUMENTS

| | | | |
|---|---|---|---|
| 11,025,942 B2* | 6/2021 | Sheikh | H04N 19/46 |
| 2007/0076957 A1 | 4/2007 | Wang et al. | |
| 2007/0189623 A1 | 8/2007 | Ryu | |
| 2011/0200256 A1 | 8/2011 | Saubat et al. | |
| 2012/0288015 A1 | 11/2012 | Zhang et al. | |
| 2014/0341280 A1 | 11/2014 | Yang et al. | |
| 2018/0129934 A1* | 5/2018 | Tao | G06N 3/084 |
| 2019/0034734 A1* | 1/2019 | Yen | G06F 18/2413 |
| 2019/0246130 A1 | 8/2019 | Sheikh et al. | |
| 2020/0014953 A1* | 1/2020 | Mammou | H04N 19/17 |

FOREIGN PATENT DOCUMENTS

| | | | |
|---|---|---|---|
| KR | 10-2018-0135898 | | 12/2018 |
| WO | 2014208575 | A1 | 12/2014 |
| WO | 2018043143 | A1 | 3/2018 |
| WO | 2018130491 | A1 | 7/2018 |

OTHER PUBLICATIONS

Unterweger, Andreas, et al. "Building a post-compression region-of-interest encryption framework for exisiting video surveillance systems: Challenges, obstacles and practical concerns." Multimedia Systems 22 (2016): 617-639. (Year: 2016) (Year: 2016).*

International Preliminary Report on Patentability for PCT Application No. PCT/US2021/027541, dated Oct. 27, 2022.

International Search Report and Written Opinion for PCT Application No. PCT/US2021/027541, dated Jul. 28, 2021.

Jung, J. "Immersive Video Activities in MPEG-I: Current Status and Upcoming Challenges", Orange Labs, Workshop: Computational Imaging with Novel Image Modalities, May 27-28, 2019, Inria, Rennes, France.

L. Cui, R. Mekuria, M. Preda and E. S. Jang, "Point-Cloud Compression: Moving Picture Experts Group's New Standard in 2020," in *IEEE Consumer Electronics Magazine*, vol. 8, No. 4, pp. 17-21, Jul. 2019, doi: 10.1109/MCE.2019.2905483.

Extended European Search Report from European Patent Application No. 21788552.4 notified Mar. 5, 2024, 11 pgs.

Duan, Ling-Yu, et al., "Video Coding for Machines: A Paradigm of Collaborative Compression and Intelligent Analytics", airxiv.org, Cornell University Library, 201 Online Library Cornell University Ithaca, NY, Jan. 13, 2020, 15 pgs.

Salahieh, Basel, et al., "Test Model 4 for Immersive Video", International Organisation for Standardisation, Brussels, BE, Jan. 2020, 45 pgs.

Unterweger, Andreas, et al., "Building a post-compression region-of-interest encryption framework for existing video surveillance systems", Multimedia Systems 2016, vol. 22, No. 5, 23 pgs.

Xia, Sifeng et al., "An Emerging Coding Paradigm VCM: a Scalable Coding Approach Beyond Feature and Signal," Pecking University, Beijing, China, 2020, 7 pgs.

Office Action from Japanese Patent Application No. 2022-553027 notified Jan. 30, 2025, 5 pgs.

Notice of Allowance from Japanese Patent Application No. 2022-553027 notified May 15, 2025, 4 pgs.

* cited by examiner

PATCH BASED VIDEO CODING FOR MACHINES

CLAIM OF PRIORITY

This application is a National Stage Entry of PCT Application Serial No. PCT/US2021/027541, filed on 15 Apr. 2021 and titled "PATCH BASED VIDEO CODING FOR MACHINES", which claims priority to U.S. Provisional Patent Application Ser. No. 63/011,179, filed on Apr. 16, 2020, and titled "PATCH BASED VIDEO CODING FOR MACHINES", which are incorporated by reference in their entireties its entirety for all purposes.

BACKGROUND

In some contexts, video compression/decompression (codec) systems may be employed such that the reconstructed video is to be used by a machine as opposed to being used for human viewing. For example, reconstructed video may be used in the context of machine learning and other applications. Currently, the MPEG Video Coding for Machines (VCM) group is studying approaches to calculate visual features from images or video and the potential to standardize the compression of those visual features using compact features. The MPEG Video Point Cloud Coding (V-PCC) and Immersive Video (MIV) draft standards describe selection of patches from multiple views, arrangement of the patches into atlases, and encode of atlases as video using traditional video codecs, and further define methods to signal metadata describing the patches and their arrangement into atlases.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures.

DETAILED DESCRIPTION

Figure 1:
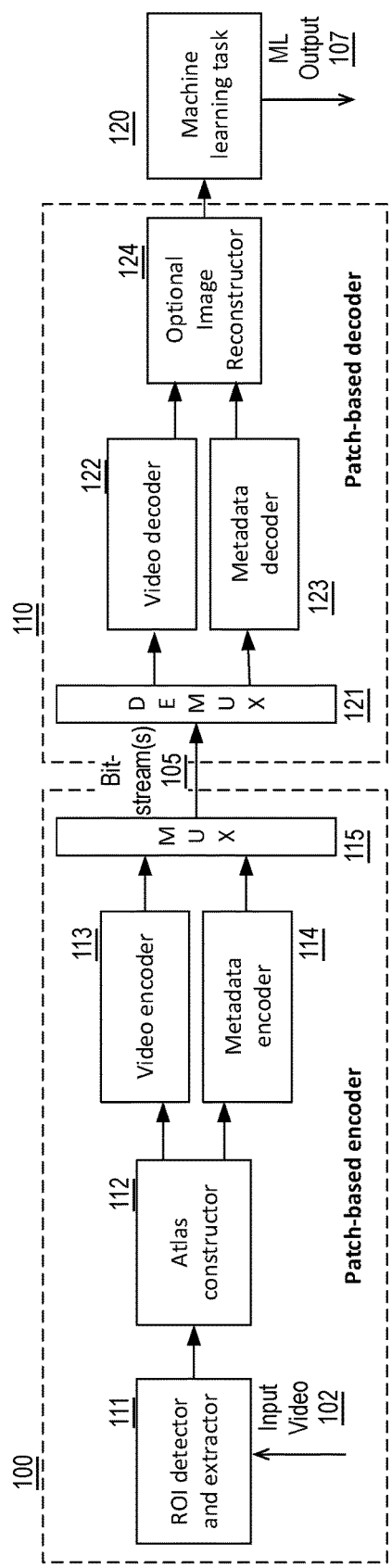
FIG. 1 is a block diagram of an example patch-based encoder, an example patch-based decoder, and an example machine learning system.

One or more embodiments or implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as set top boxes, smart phones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM);

magnetic disk storage media; optical storage media; flash memory devices; electrical, optical, acoustical or other forms of propagated signals (e.g., carrier waves, infrared signals, digital signals, etc.), and others.

References in the specification to "one implementation", "an implementation", "an example implementation", etc., indicate that the implementation described may include a particular feature, structure, or characteristic, but every embodiment may not necessarily include the particular feature, structure, or characteristic. Moreover, such phrases are not necessarily referring to the same implementation. Further, when a particular feature, structure, or characteristic is described in connection with an embodiment, it is submitted that it is within the knowledge of one skilled in the art to effect such feature, structure, or characteristic in connection with other implementations whether or not explicitly described herein.

The terms "substantially," "close," "approximately," "near," and "about," generally refer to being within +/−10% of a target value. For example, unless otherwise specified in the explicit context of their use, the terms "substantially equal," "about equal" and "approximately equal" mean that there is no more than incidental variation between among things so described. In the art, such variation is typically no more than +/−10% of a predetermined target value. Unless otherwise specified the use of the ordinal adjectives "first," "second," and "third," etc., to describe a common object, merely indicate that different instances of like objects are being referred to, and are not intended to imply that the objects so described must be in a given sequence, either temporally, spatially, in ranking or in any other manner.

Methods, devices, apparatuses, computing platforms, and articles are described herein related to video coding for machines such that reconstructed video is to be used by a machine rather than being viewed by a human.

As discussed, in some contexts, video compression/decompression (codec) systems may be employed such that the reconstructed video is to be used by a machine as opposed to being viewed by a human. For example, reconstructed video may be used in the context of machine learning and other applications. As used herein, the terms machine learning, machine learning operations, etc. indicate the use of a machine learning application to determine an output from a portion of video. Such machine learning applications include, for example, human face recognition, object recognition, image recognition, and others. Such applications may be deployed in a wide variety of contexts such surveillance, video classification, image tagging, and many others. In some embodiments, video analytics systems require the use of video compression for transmission of captured video to an analytics engine. The techniques discussed herein improve coding efficiency, accuracy, and speed of compression of video intended for machine learning rather than human viewing such that transmission bandwidth and pixel rate are advantageously reduced.

In some embodiments, rectangular regions of interest in a video are detected and placed into patches. Although illustrated and discussed with respect to rectangular regions of interest, any suitable shapes may be used. As used herein, the term regions of interest indicates a region to which a machine learning operation is to be applied (whether or not the result is positive recognition or not). The patches are packed together into a video atlas (or multiple atlases), which may also include a downsampled representation of the entire input video frame. The video atlas is encoded with video coder, such as an AVC (Advanced Video Coding) compliant encoder, an HEVC (High Efficiency Video Coding) compliant encoder, a VVC (Versatile Video Coding compliant encoder, etc. Furthermore, metadata are signaled to indicate the size and position of each region of interest in the original video and in the atlas video. For example, the metadata map the regions of interest in between the one or more atlases and the frame of video. Such techniques advantageously code only regions of interest of the video rather than the full video to reduce the bitrate and the pixel rate required for the video while maintaining video quality in the regions of interest to avoid reduced accuracy of the machine learning tasks using the reconstructed video.

As discussed, the one or more atlases are absent the full frame of video at a resolution equal to or higher than that of the regions of interest. Furthermore, the resultant one or more bitstreams from encode of the atlas(es) are absent a representation of the full frame of video at a resolution equal to or higher than that of the coded regions of interest. In some embodiments, the full frame of video is fully absent (e.g., the bitstream(s) do not include a representation of the full frame of video at all). In some embodiments, the full frame of video is represented, but at a resolution lower than that of the regions of interest. Notably, the techniques discussed herein are not dependent on pre-defined visual features. Instead, the actual regions of interest are coded. Therefore, the techniques discussed herein are advantageously flexible to changes in optimal visual features. Furthermore, the techniques used to identify the region of interest may be chosen by the encoder and are advantageously not required to be standardized such that aspects included in any standardization of the techniques discussed herein avoid obsolescence as state-of-the-art machine learning evolves.

FIG. 1 is a block diagram of an example patch-based encoder 100, an example patch-based decoder 110, and an example machine learning system 120, arranged in accordance with at least some implementations of the present disclosure. As shown, patch-based encoder 100 includes a region of interest (ROI) detector and extractor 111, an atlas constructor 112, a video encoder 113, a metadata encoder 114, and a multiplexer 115. Patch-based decoder 110 includes a demultiplexer 121, a video decoder 122, a metadata decoder 123, and an optional image reconstructor 124. As shown, machine learning system 120 performs a learning task based on received data. Patch-based encoder 100, patch-based decoder 110, machine learning system 120, and any other encoders, decoders, machine learning systems, or other devices may each be implemented in any suitable form factor device or one or more of such devices including a server computer, a cloud computing environment, personal computer, a laptop computer, a tablet, a phablet, a smart phone, a gaming console, a wearable device, a display device, an all-in-one device, a two-in-one device, or the like. In some embodiments, patch-based decoders and machine learning systems are implemented in the same device.

At patch-based encoder 100, video 102 is input to ROI detector and extractor 111. Such input video 102 may include any suitable video frames, video pictures, sequence of video frames, group of pictures, groups of pictures, video data, or the like in any suitable resolution. For example, the video may be video graphics array (VGA), high definition (HD), Full-HD (e.g., 1080p), 4K resolution video, 8K resolution video, or the like, and the video may include any number of video frames, sequences of video frames, pictures, groups of pictures, or the like. In some embodiments, input video 102 is immersive video having multiple views of a scene. Techniques herein are discussed with respect to frames and pictures (which are used interchangeably), blocks, and sub-blocks having various sizes for the sake of clarity of presentation. As used herein, a block or coding unit may be any size and shape such that it includes a plurality of pixel samples (typically square or rectangular) in any suitable color space such as YUV. Furthermore, a block or coding unit may have sub-blocks or prediction units, which also may be characterized as blocks depending on context. Also a block, sub-block, or coding unit may be optionally divided into a transform block or transform unit for the purposes of transformation of residuals. As used herein, the term size indicates the size of such coding units, transform units, etc. and does not necessarily include the unit itself. The term coding unit or transform unit may indicate the size thereof. Such frames may be characterized as pictures, video pictures, sequences of pictures, video sequences, etc., such coding units or blocks may be characterized as largest coding units, coding units, coding blocks, macroblocks, sub-units, sub-blocks, etc.

ROI detector and extractor 111 of patch-based encoder 100, receives video 102 and detects and extracts patches or regions of interest using any suitable technique or techniques. For example, ROIs may be detected using feature extraction, machine learning, deep neural networks including convolutional neural networks, and so on. For example, the regions of interest may include regions of a frame or picture of video that is deemed to be of interest to machine learning system 120. In some embodiments, regions of interest are regions detected to include a face such that machine learning system 120 may perform face recognition on the detected face. Notably, face detection is a relatively simple task compared to the more difficult task of face recognition. The patches or regions of interest are input to atlas constructor 112 of patch-based encoder 100, which forms one or more atlases using the patches. As used herein, the term atlas indicates an image or frame that includes a number of image patches or regions of interest. For example, an atlas may be formed by clipping and packing regions of interest from a frame of video into the atlas. Any number of atlases may be formed using such techniques with each atlas including one or more of the regions of interest. Atlas constructor 112 or ROI detector and extractor 111 (or an ROI extractor block thereof) may optionally perform image scaling, to reduce the resolution of individual patches.

Atlas constructor 112 outputs video atlases (e.g., video frames at original resolution or at sub-sampled resolution) for encoding using video encoder 113 of patch-based encoder 100, which may implement any suitable encode such as a standards compliant encode. For example, video encoder 113 of patch-based encoder 100 may employ HEVC, AVC, VVC, or the like to generate a standards compliant bitstream of bitstream(s) 105. Atlas constructor 112 also outputs metadata describing the patches (e.g., regions of interest) and the atlases, which is encoded by metadata encoder 114 of patch-based encoder 100. The outputs of video encoder 113 and metadata encoder 114 are multiplexed together via multiplexer 115 of patch-based encoder 100 into one or more bitstreams 105. The resultant bitstream(s) 105 is transmitted by patch-based encoder 100 to patch-based decoder 110, for eventual decode by patch-based based decoder 110, or the like.

Patch-based decoder 110 receives bitstream(s) 105 from patch-based encoder 100 or another device or system. At patch-based decoder 110, bitstream(s) 105 is demultiplexed into the video bitstream and metadata bitstream components, which are decoded by video decoder 122 and metadata decoder 123, respectively. Optionally, image reconstructor 124 can reconstruct images or frames that are of the same size as those of input video 102. Such reconstruction may include scaling of individual patches and arranging the patches to the same locations as where they had been located in the images or frames input to patch-based encoder 100 as input video 102. As shown, either the reconstructed images or the patches (e.g., regions of interest) are input to machine learning system 120 for performance of a machine learning task to generate machine learning (ML) output 107. The machine learning task may be any suitable machine learning task such as object detection, object recognition, facial detection, facial recognition, semantic segmentation, etc. Machine learning output 107 may include any data structure indicative of the machine learning task such as pixel segmentation data, pixel label data, an object recognition identifier, a facial recognition identifier, or the like.

Figure 2:
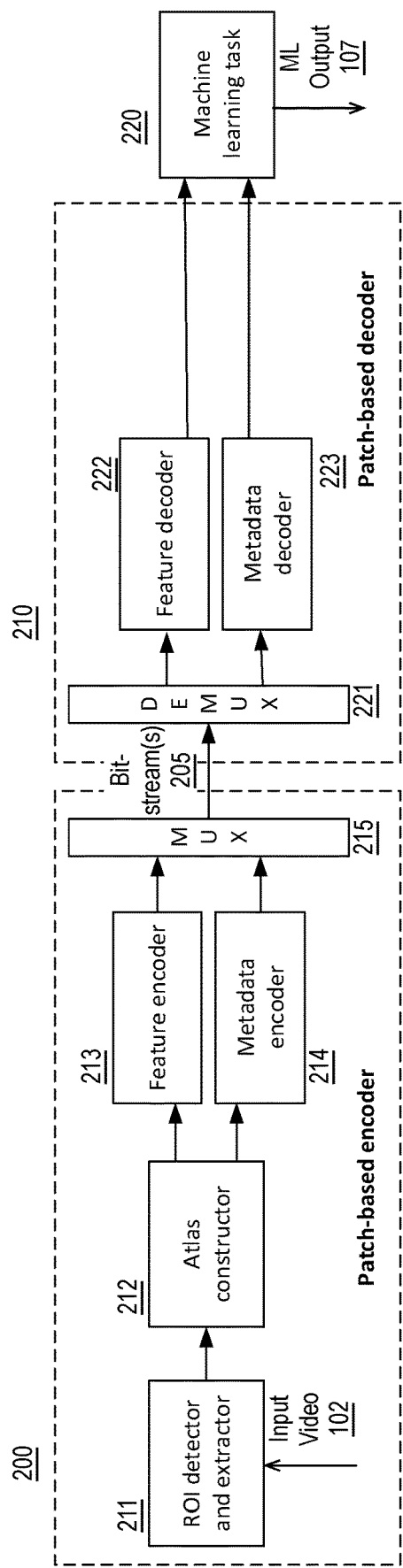
FIG. 2 is a block diagram of another example patch-based encoder, another example patch-based decoder, and another example machine learning system.

FIG. 2 is a block diagram of another example patch-based encoder 200, another example patch-based decoder 210, and another example machine learning system 220, arranged in accordance with at least some implementations of the present disclosure. As shown, patch-based encoder 200 includes a region of interest (ROI) detector and extractor 211, an atlas constructor 212, a feature encoder 213, a metadata encoder 214, and a multiplexer 215. Patch-based decoder 210 includes a demultiplexer 221, a feature decoder 222, and a metadata decoder 223. As shown, machine learning system 220 performs a learning task based on received data. Notably, FIG. 2 illustrates an alternative system, in which a visual feature encoder and decoder replace the video encoder and decoder discussed with respect to FIG. 1. The system of FIG. 2, allows the techniques discussed herein to be used in combination with feature-based encoding techniques. For example, components of the systems of FIGS. 1 and 2 may be combined in any suitable manner.

At patch-based encoder 200, input video 102 is input to ROI detector and extractor 211, which detects and extracts patches using any suitable technique or techniques discussed herein with respect to ROI detector and extractor 111, for example. The patches or regions of interest are input to atlas constructor 212 of patch-based encoder 200, which forms one or more atlases using the patches. Atlas constructor or ROI extractor 212 may optionally perform image scaling, to reduce the resolution of individual patches. Atlas constructor 212 outputs features for encoding using feature encoder 213 of patch-based encoder 200, which may implement any suitable encode techniques. Atlas constructor 212 also outputs metadata describing the features and the atlases, which is encoded by metadata encoder 214 of patch-based encoder 200. The outputs (e.g., bitstreams) of the video encoder and metadata encoder are multiplexed together via multiplexer 215 of patch-based encoder 200 into one or more bitstream(s) 205. The resultant bitstream(s) 205 is transmitted by patch-based encoder 200 to patch-based decoder 210, for eventual decode by patch-based decoder 210, or the like.

Patch-based decoder 210 receives one or more bitstream(s) 205 from patch-based encoder 200 or another device or system. At patch-based decoder 210, one or more bitstream(s) 205 is demultiplexed into the feature bitstream and metadata bitstream components, which are decoded by feature decoder 222 and metadata decoder 223, respectively. As shown, the reconstructed features and the decoded metadata are input to machine learning system 120 for performance of a machine learning task based on the decoded features and their locations in the input video as indicated by the metadata. The machine learning task may be any suitable machine learning task such as object detection, object recognition, semantic segmentation, etc.

The metadata to be encoded and decoded as discussed above includes information about the number of patches (e.g., regions of interest), the number of atlases, the size of each atlas, the size of each patch (e.g., region of interest), and the correspondence between the video frame and the patches (e.g., region of interest). For example, the metadata may provide correspondence, for a patch (e.g., region of interest), between the location (and size) of the patch in the input video and the location (and size) of the patch in one of any number of atlases. For each patch, the information may include the following: original image patch position and size (top, left, width, height) and atlas patch position and size (top, left, width, height).

In some embodiments, the size of each patch may be explicitly signaled. However, as an alternative to explicitly signaling the size of the patch in the atlas, a scaling factor may be signaled, either with a single scaling factor used for both the horizontal and vertical dimensions or with separate horizontal and vertical scaling factors signaled. In some embodiments, a scaling factor per atlas is signaled and patches are arranged into the atlases that correspond to their scaling factor. The scaling factor selected by the encoder may be based on the expected importance of the particular patch to the machine learning task, for example, because a patch represents a detected object with high confidence or because the patch contains significant high frequency video content. In some embodiments, higher confidence value or higher frequency content video has a smaller scaling factor with respect to lower confidence value or lower frequency video content. In some embodiments, the scaling factor is signaled as a log 2 number (e.g. a downscaling factor of 8 may be signaled as log 2(8)=3 bits).

The following Table 1 provides example syntax for each patch (e.g., region of interest). For example, such syntax may be coded as metadata for each patch (e.g., region of interest) in the one or more atlases.

TABLE 1

Example Syntax

| | |
|---|---|
| patch_data_list( ) { | |
|   num_patches_minus1 | ue(v) |
|   for( i = 0; i <= num_patches_minus1; i++ ) { | |
|     patch_source_pos_x | u(v) |
|     patch_source_pos_y | u(v) |
|     patch_source_pos_width | u(v) |
|     patch_source_pos_height | u(v) |
|     patch_cur_pic_pos_x | u(v) |
|     patch_cur_pic_pos_y | u(v) |
|     patch_scale_flag | u(1) |
|     if (patch_scale_flag) { | |
|       patch_log2_scale_x | u(3) |
|       patch_log2_scale_y | u(3) |
|     } | |
|   } | |
| } | |

In the example syntax, the information is signaled for a rectangular bounding box around a patch. However, in some embodiments, patches may overlap in an atlas if a patch does not occupy all sample position of the rectangular bounding box. As shown in Table 1, in some embodiments, for each patch (e.g., region of interest), a top left position in the atlas (patch_source_pos_x, patch_source_pos_y), a size in the atlas (patch_source_pos_width, patch_source_pos_height), and a top left position in the frame (patch_cur_pic_pos_x, patch_cur_pic_pos_y) are provided. Furthermore scaling information to size the patch (e.g., region of interest) is provided first with a flag to indicate whether scaling is employed (patch_scale_flag) and, if scaling information is provided, through a scaling factor, which may be signaled as a log 2 number (patch_log 2_scale_x, patch_log 2_scale_y).

Any suitable techniques may be used to determine the regions of interest (e.g., by ROI detector and extractor 111 of patch-based encoder 100 or ROI detector and extractor 211 of patch-based encoder 200). In some embodiments, the employed detection and extraction techniques depend on the intended machine learning task. For example, for a use case where the machine learning task is face recognition, the ROI detector may perform face detection. Notably, face detection is a much simpler operation than face recognition. Furthermore, face recognition/matching requires access to a library of faces, which is not needed for face detection. For example, ROI detector and extractor 111 of patch-based encoder 100 or ROI detector and extractor 211 of patch-based encoder 200 may perform detection and extraction that supports the machine learning task to be employed after decode. In some embodiments, ROI detector and extractor 111 or ROI detector and extractor 211 performs object detection to support object recognition or semantic segmentation after decode.

Figure 3:
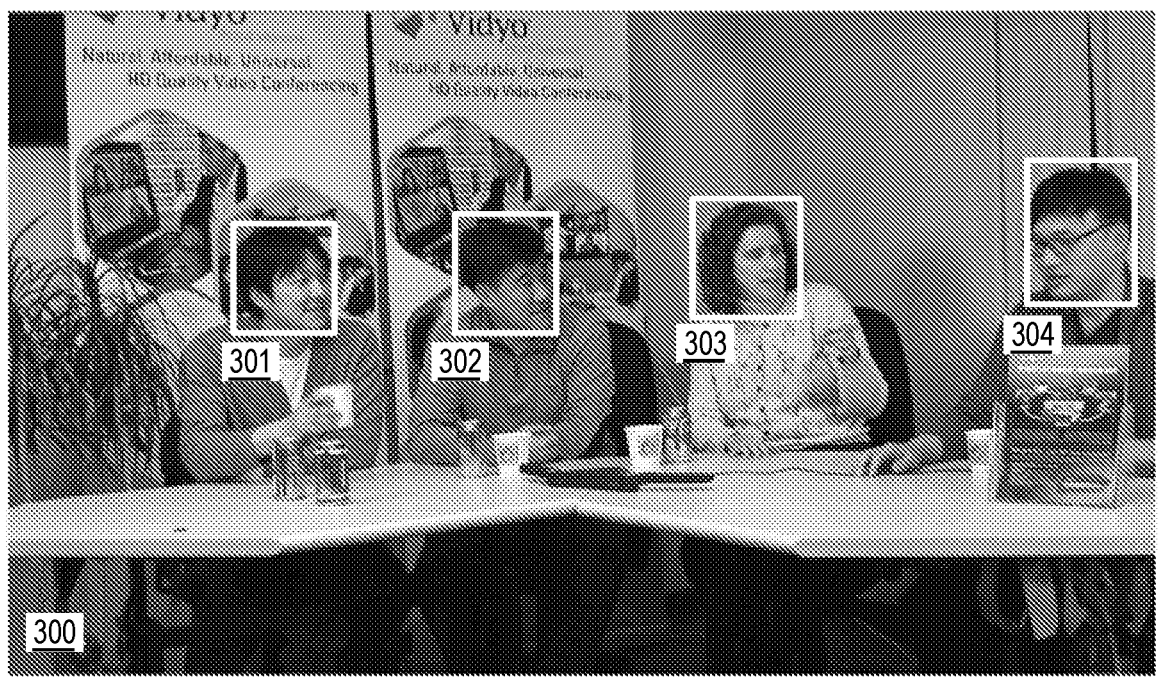
FIG. 3 illustrates an example input image including example detected regions of interest.

FIG. 3 illustrates an example input image or frame 300 including example detected regions of interest 301, 302, 303, 304, arranged in accordance with at least some implementations of the present disclosure. For example, input image or frame 300 may be a frame of input video 102. As shown, ROI detector and extractor 111 of patch-based encoder 100 or ROI detector and extractor 211 of patch-based encoder 200 may detect and extract regions of interest 301, 302, 303, 304 inclusive of indicating a bounding box around each of regions of interest 301, 302, 303, 304. In the example of FIG. 3, each of detected regions of interest 301, 302, 303, 304 is a face and facial detection may be used to determine each facial ROI and the bounding box around each of regions of interest 301, 302, 303, 304. Furthermore, as shown, each of regions of interest 301, 302, 303, 304, as indicated by their bounding boxes are located at particular positions within input image or frame 300.

Figure 4:
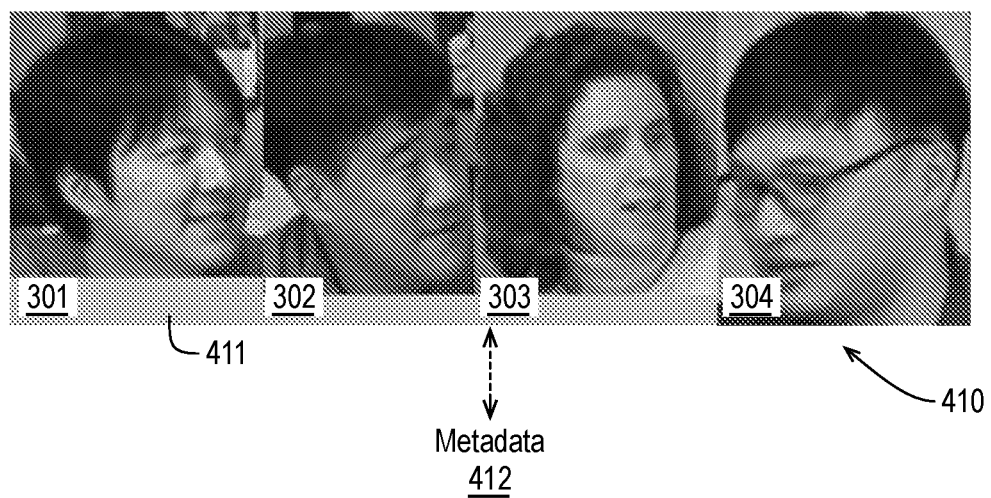
FIG. 4 illustrates an example atlas formed from the example input image of FIG. 3.

FIG. 4 illustrates an example atlas 400 formed from the example regions of interest of input image or frame of FIG. 3, arranged in accordance with at least some implementations of the present disclosure. As shown, a patch (e.g., region of interest) as defined by the bounding box of each detected region of interest 301, 302, 303, 304 inclusive of an object of interest, face of interest, etc. is determined and arranged in atlas 400. For example, each detected region of interest 301, 302, 303, 304 is put into a rectangular patch, and all of the patches are arranged into atlas 400 as shown. For example, atlas constructor 111 of patch-based encoder 100 or atlas constructor 211 of patch-based encoder 200 may generate atlas 400 of FIG. 4 based on the detected faces (and corresponding patches), detected objects, detected features, or the like of input image or frame 300 illustrated in FIG. 3.

As discussed, in some embodiments, the atlas video inclusive of atlas 400 and other atlases for the same time instance or atlases for multiple time instances are encoded using a video encoder such as video encoder 113. As such, it is desirable to have coherency of the content in the atlas video across consecutive pictures so that inter-frame prediction can efficiently code the video. Furthermore, video encoders such as HEVC compliant video encoders and AVC compliant video encoders require all coded pictures in a video sequence have the same picture size (e.g. width and height). In embodiments where the video encoder of patch-based encoder 100 employs the HEVC or AVC codec (or other codec requiring a video sequence to have the same picture size), the atlases maintain the same picture size for the entire sequence until a new intra-coded picture (e.g., I-picture or IDR-picture) is used. In some embodiments, first and second atlases of a video sequence have the same size. In some embodiments, first and second atlases of a video sequence have the same size in response to being encoded by one of an HEVC or an AVC compliant encoder. In some embodiments, detected and extracted patches from the same locations in input video frames are placed in the same locations and have the same size (and resolution) within the atlases to increase temporal correlation in the video atlases for encode.

In the VVC standard, a reference picture resizing feature is provided that allows individual coded pictures in the same sequence to have different sizes. In VVC, the actual width and height of each coded picture is signaled, along with the maximum picture height and width for the sequence. In some embodiments, use of the VVC reference picture resizing feature is used to add additional patches partway through a sequence of atlases, for example, if new objects enter the video, which would change the size of the atlas without requiring modification of the size and position of the other patches in the atlases from previous pictures and without requiring an intra-coded picture. Such techniques may improve inter-frame prediction and coding efficiency when new objects enter the video.

Figure 5:
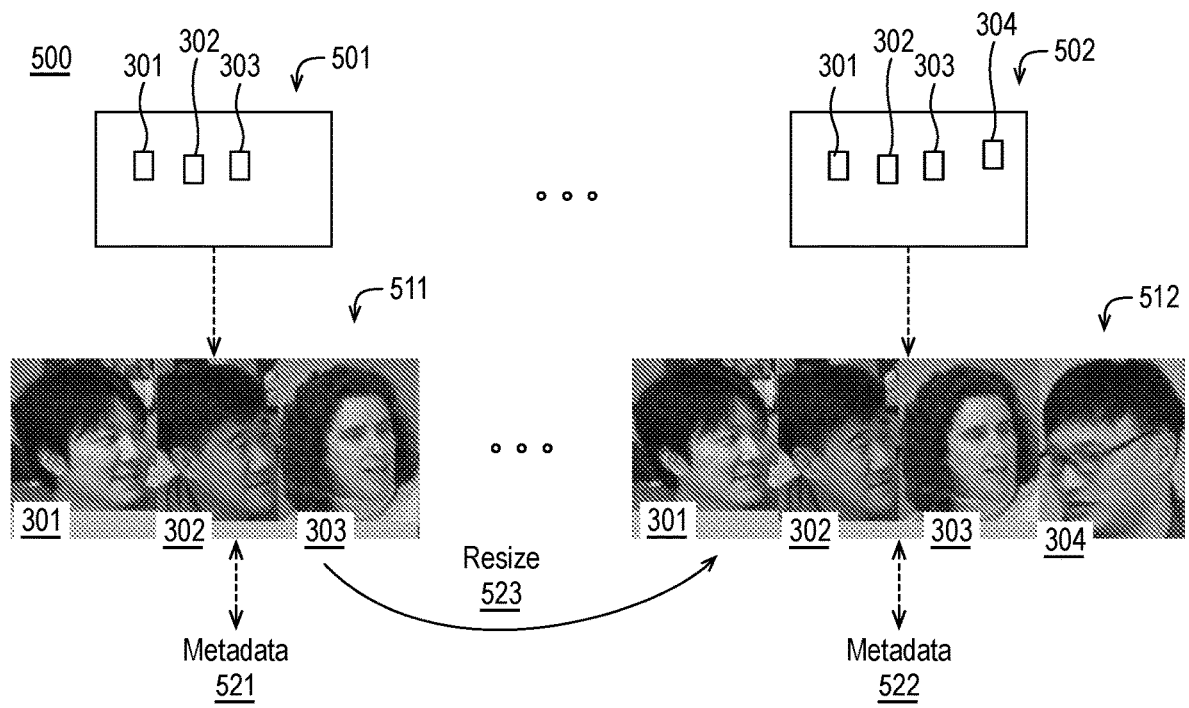
FIG. 5 illustrates example atlas resizing in the context of reference picture resizing.

FIG. 5 illustrates example atlas resizing 500 in the context of reference picture resizing, arranged in accordance with at least some implementations of the present disclosure. As shown, in some embodiments, only regions of interest 301, 302, 303 are present in an image or frame 501 of input video. For frame 501 (for time or time stamp t), a corresponding atlas 511 is formed including regions of interest 301, 302, 303 as patches therein. Metadata 521 is generated for atlas 511 to provide a mapping of regions of interest 301, 302, 303 in atlas 511 and in frame 501 (which is shown out of scale for sake of clarity of presentation) as discussed herein. Metadata 521 may also indicate a size of atlas 511 in accordance with a standard codec for example.

In a subsequent frame 502 (for time or time stamp t+x), region of interest 304 is detected for the first time. For frame 502, a corresponding atlas 512 is formed including regions of interest 301, 302, 303, 304 as patches therein such that formation of atlas 512 includes a resize operation 523 to change one or both of a height and width of the atlas. Metadata 522 is generated for atlas 511 to provide a mapping of regions of interest 301, 302, 303 in atlas 512 and in frame 502. Furthermore, metadata 522 may indicate a size of atlas 512 and/or a change in size relative to atlas 511 in accordance with a standardized codec for example. As discussed, a video codec may provide a resizing feature to all coded pictures or frames in a same sequence to have different sizes. Thereby, region of interest 304 may be efficiently added to atlas 512 while regions of interest 301, 302, 303 in atlas 512 may be coded using inter-coding techniques relative to prior regions of interest (having similar or the same content).

Furthermore, better coding efficiency for inter-frame prediction may be achieved if the arrangement of patches into atlases is consistent for the consecutive pictures (e.g., atlases), as discussed above. However, if the ROIs represent moving objects, it is likely for the ROI sizes to change per picture (e.g., across frames). In some embodiments, particularly in systems tolerant of latency, lookahead may be performed to find the ROI for a particular object for multiple pictures. In some embodiments, an overall ROI is found that includes all positions occupied by individual picture ROIs, and the overall ROI is used in the ROI extraction block.

In some embodiments, lookahead is not performed (e.g., lookahead may not be permitted due to latency issues). In some embodiments, the encoder forms a larger ROI for the objects in the first picture, by placing a buffer around each object. Then, in subsequent pictures, the ROI size would not be required to change if the object size did not become larger than the selected larger ROI. The ROI detector may also choose to not move the position of the ROI, in order to maintain consistency of the background. In some embodiments, a buffer of a particular fraction of the ROI in a first frame (e.g., 20% to 50% added buffer area) is added around the ROI and the patch extracted for the ROI is not moved and the ROI size does not change (from the buffered patch size including the ROI plus the buffer) across multiple atlases such that the ROI is expected to change size within the buffered patch size but not expand outside of it. Such techniques may provide for enhanced temporal correlation and coding in some contexts.

Figure 6:
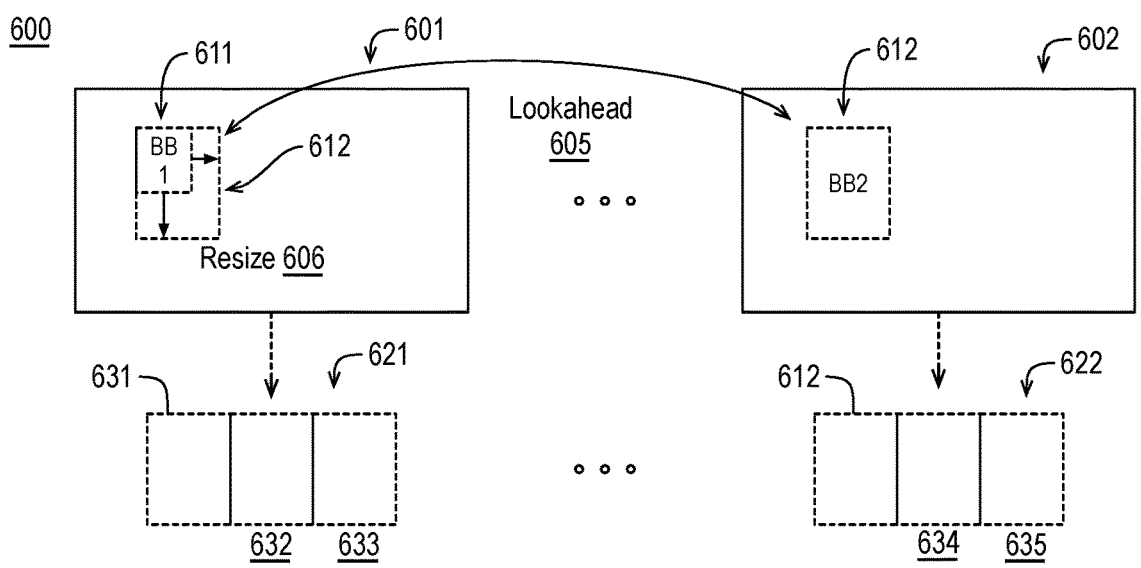
FIG. 6 illustrates example region of interest resizing in the context of lookahead analysis or addition of a buffer region without lookahead analysis.

FIG. 6 illustrates example region of interest resizing 600 in the context of lookahead analysis or addition of a buffer region without lookahead analysis, arranged in accordance with at least some implementations of the present disclosure. As shown, in some embodiments, a region of interest 611 having a relatively small bounding box (BB1) is detected in a frame (e.g., a frame at time or time stamp t). For example, the bounding box of region of interest 611 may be formed immediately around a detected object, a detected face, or the like such that the no or a very small buffer (e.g., 1 to 5 pixels) is provided around the detected object, face, etc.

As shown, in some embodiments, a lookahead analysis 605 is performed on any number of temporally subsequent frames (e.g., frames at times or time stamps t+1, t+2, . . . ) at any rate such as every frame, every other frame, etc. or for a single frame at a particular lookahead from the current frame. In lookahead frame 602, detection is again performed to determine a bounding box around a corresponding region of interest 612 such that regions of interest 611, 612 correspond in that they are expected to include the same object, face, or the like based on shared or similar features or shared or similar frame location. Notably, region of interest 612 is larger than region of interest 611. In some embodiments, based on lookahead analysis 605 detecting a larger region of interest 611 in temporally subsequent frame 602, region of interest 611 is expanded to the size of region of interest 612 as shown with respect to resize operation 606. With respect to frame 601, a region of interest 631 inclusive of region of interest 611 and having the size of region of interest 612 is then inserted in atlas 621. Similarly, for all frames from current frame 601 through temporally subsequent frame 602 (e.g., with any number of frames between frames 601, 602) a region of interest having the size of region of interest 612 (or a maximum region of interest size for any frames evaluated as part of lookahead analysis 605) is inserted into the corresponding atlas.

As shown, atlas 621 may include region of interest 631 and other regions of interest including regions of interest 632, 633, which may also be resized using the discussed lookahead analysis 605 to a maximum size of a corresponding region of interest detected using lookahead analysis 605. Similarly, atlas 622 may include region of interest 612 (not resized in this example due to having the maximum region of interest size) and other regions of interest including regions of interest 634, 635, which may be resized as needed to a maximum size of a corresponding region of interest detected using lookahead analysis 605. For example, the maximum region of interest size may be detected in any frame evaluated using lookahead analysis 605.

As discussed, inter-frame prediction coding efficiency may be advantageously increased by arranging patches (e.g., regions of interest) into atlases consistently for consecutive atlases. To achieve such arrangement with regions of interest that represent moving objects and are therefore likely to change in size, lookahead analysis 605 may be used to find an overall ROI or maximum ROI size that includes all positions occupied by individual picture ROIs, and the overall ROI or maximum ROI size is used in the ROI extraction block to the atlas for the corresponding frame.

In other embodiments, lookahead analysis 605 is not performed. For example, lookahead analysis 605 may not be permitted due to latency issues. In some embodiments, resize operation 606 may be performed absent lookahead analysis 605 to change the size of region of interest 611 (e.g., when an object or face is first detected) to a larger size by any suitable amount. For example, the bounding box or detected region of interest may be increased in size by 20% to 50%. Subsequently, the larger size region of interest (represented here by the size of region of interest 612 and region of interest 631 for the sake of clarity of presentation) is then inserted into atlas 621. Similar operations may be performed for regions of interest 632. Using such padding or expanded regions of interest increase the likelihood the region of interest will remain consistent through encode. For example, in subsequent pictures or frames such as frame 602, the ROI size would not be required to change if the object size did not become larger than the selected larger ROI as shown with respect to region of interest 612 and bounding box BB2. The ROI detector may also choose to not move the position of the ROI, in order to maintain consistency of the background. In some embodiments, a buffer of a particular fraction of the ROI in a first frame (e.g., 20% to 50% added buffer area) is added around the ROI and the patch extracted for the ROI is not moved and the ROI size does not change (from the buffered patch size including the ROI plus the buffer) across multiple atlases such that the ROI is expected to change size within the buffered patch size but not expand outside of it. Such techniques may provide for enhanced temporal correlation and coding in some contexts.

In some embodiments, the machine learning task application may be interested in having access to the full video and not just the ROIs. In some embodiments, the entire input image (or frame) is included within a patch, with the patch downscaled to reduce the bitrate and pixel rate.

Figure 7:
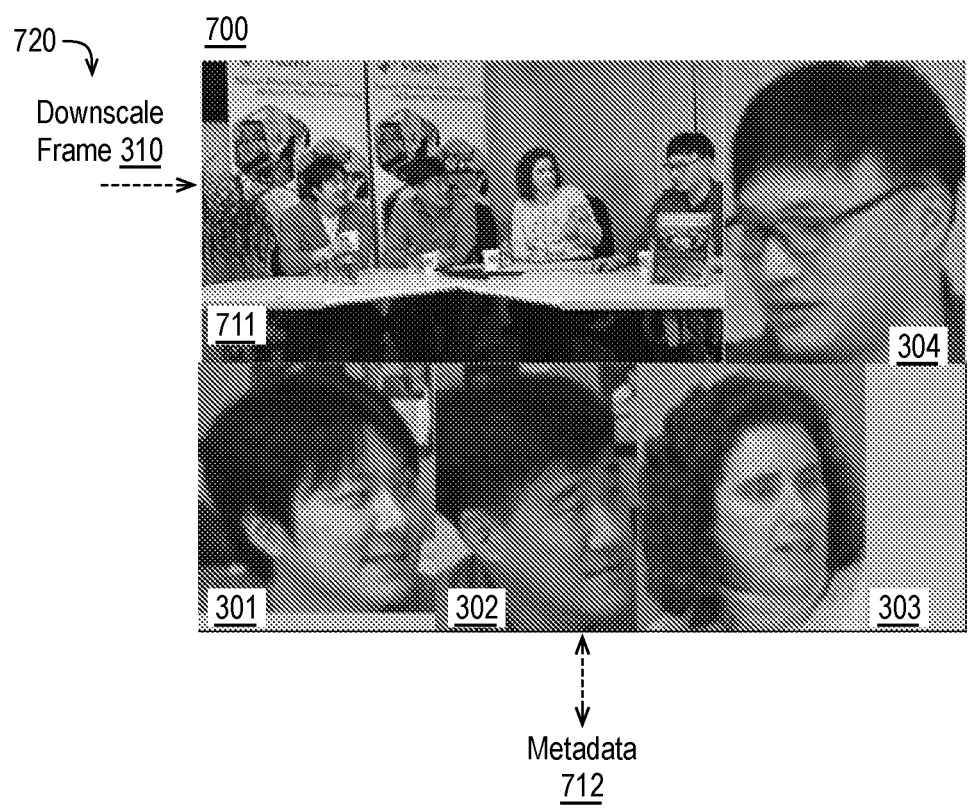
FIG. 7 illustrates an example atlas including extracted region of interest patches and a low resolution full input image or frame.

FIG. 7 illustrates an example atlas 700 including extracted region of interest patches 301, 302, 303, 304 and a low resolution full input image or frame 711, arranged in accordance with at least some implementations of the present disclosure. As shown, ROI detector and extractor 111 of patch-based encoder 100 or ROI detector and extractor 211 of patch-based encoder 200 may detect and extract regions of interest 301, 302, 303, 304 by indicating a bounding box around each of regions of interest 301, 302, 303, 304 and include each of the patches or regions of interest 301, 302, 303, 304 (as defined by the bounding box around each of regions of interest 301, 302, 303, 304) as well as the corresponding input image of video (e.g., the image from which regions of interest 301, 302, 303, 304 were extracted) into atlas 700. In the example of FIG. 7, each of regions of interest 301, 302, 303, 304 is a face; however any type of ROI may be included.

Notably, for improved coding efficiency, input frame 310 is downscaled using any suitable technique or techniques such as downsampling as shown at downscaling operation 720 to a downscaled frame 711 having a resolution less than that of regions of interest 301, 302, 303, 304. In some embodiments, regions of interest 301, 302, 303, 304 have the same resolution of input frame 310 and downscaled frame 711 has a lower resolution with respect to the resolution of input frame 310. In some embodiments, regions of interest 301, 302, 303, 304 have a lower resolution than input frame 310 and downscaled frame 711 has a yet lower resolution than regions of interest 301, 302, 303, 304. For example, regions of interest 301, 302, 303, 304 may be provided at a higher resolution (relative to downscaled frame 711) for improved machine learning after decode. As shown, metadata 712 are also generated and encoded for atlas 700 with metadata 712 providing a mapping between sizes and locations of regions of interest 301, 302, 303, 304 in atlas 700 and in input frame 310 as well as an indicator of the presence of downscaled frame 711 and a scaling factor thereof.

In some embodiments, scalable coding is used to code the patches (e.g., regions of interest) representing objects with respect to the patch or atlas containing the lower resolution full image. For example, the low resolution full image may be encoded as a base layer of a scalable video encoder and each patch may be encoded as an enhancement layer of the scalable video encoder with the enhancement layer referencing the base layer for encode.

Figure 8:
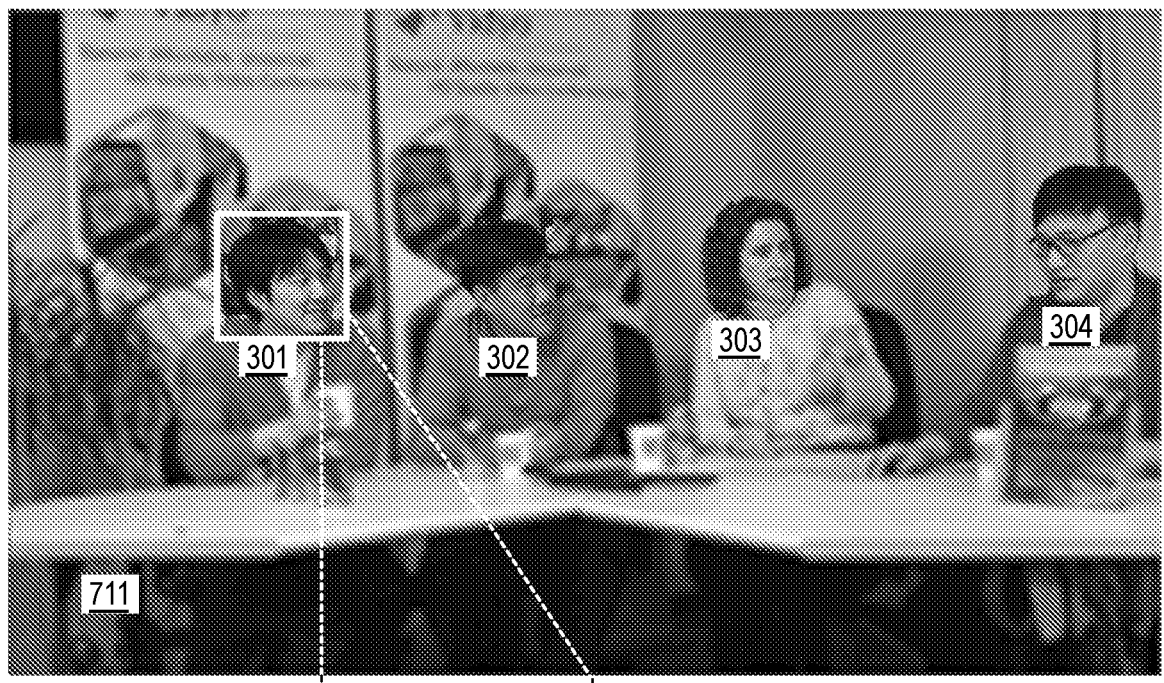
FIG. 8 illustrates example scalable video 800 including coding regions of interest with respect to the same regions of a downscaled frame.
Figure 8:
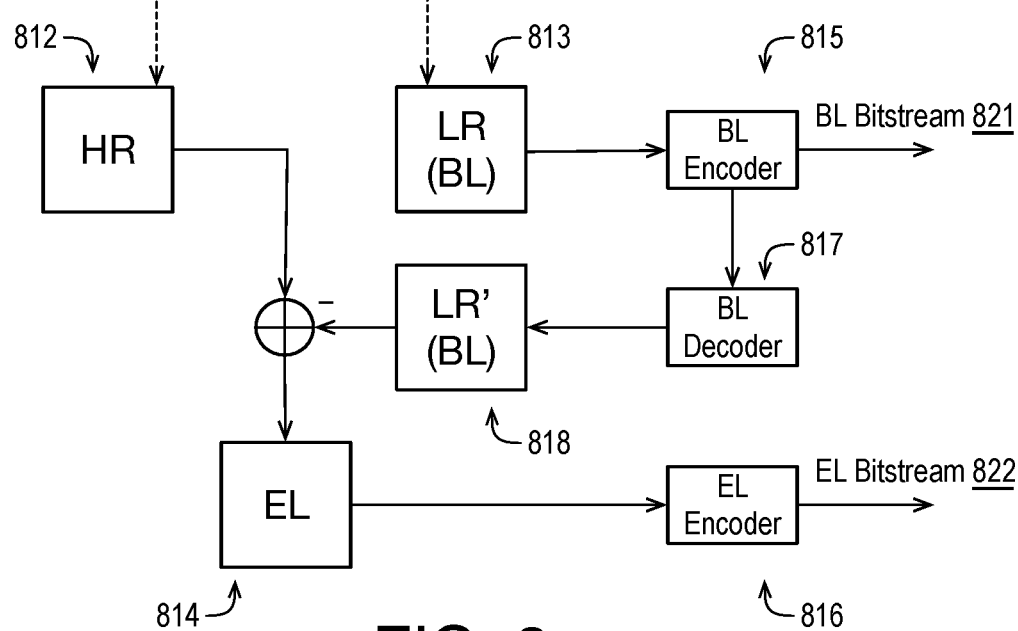

FIG. 8 illustrates example scalable video coding 800 including coding regions of interest 301, 302, 303, 304 with respect to the same regions of downscaled frame 711, arranged in accordance with at least some implementations of the present disclosure. As shown with respect to region of interest 301, each region of interest may be extracted as a high or higher resolution layer 812 and a corresponding region of downscaled frame 711 may be extracted as a low or lower resolution layer 813. Furthermore, low or lower resolution layer 813 provides a base layer (BL) in scalable video coding 800.

In the context of scalable video coding 800, at the encode side, low or lower resolution layer 813 is encoded via BL encoder 815 to generate a BL bitstream 821. Furthermore, a local decode loop is applied vid BL decoder 817 and the resultant reconstructed version of low or lower resolution layer 818 is differenced with high or higher resolution layer 812 to generate an enhancement layer (EL) 814. Enhancement layer 814 is then encoded using EL encoder 816 to generate an EL bitstream 822. BL bitstream 821 and EL bitstream 822 may be included in bitstreams 105 as discussed herein. For example, portions of an atlas inclusive of downscaled frame 711 and region of interest 301 may be coded using such techniques.

At the decode side, BL bitstream 821 is decoded using a BL decoder 817 to generate reconstructed version of low or lower resolution layer 818. Furthermore, EL bitstream 822 is decoded using an EL decoder to generate enhancement layer 814. Enhancement layer 814 and reconstructed version of low or lower resolution layer 818 are then added to generate a reconstructed version of region of interest 301. The same operations may be performed with respect to any number regions of interest 301, 302, 303, 304 and corresponding regions of downscaled frame 711. Such techniques may leverage the presence of downscaled frame 711 for improved coding efficiency.

In some embodiments, regions of interest 301, 302, 303, 304 overlap one another in the input image. In some embodiments, at the decoder, reconstruction of an input image at the original resolution is performed, for example, when preferred for machine learning task. In some embodiments, the input image may be reconstructed at a lower resolution. Furthermore, if the machine learning task can operate directly on patches, the pixel rate required for doing the machine learning task is reduced. In some embodiments, only patches are encoded and transmitted for reduced bitrate and pixel rate. For example, the reconstructed original size image may have gaps for the areas not included within a patch. In some embodiments, a single color such as gray can be used to fill the gaps. In some embodiments, an atlas including only ROI patches (please refer to FIG. 4) is encoded, reconstructed (at the decoder), and formed into a reconstructed image with areas between the ROI patches left un-encoded and reconstructed with areas between the ROI patches, as discussed, being provided at a single color.

Figure 9:
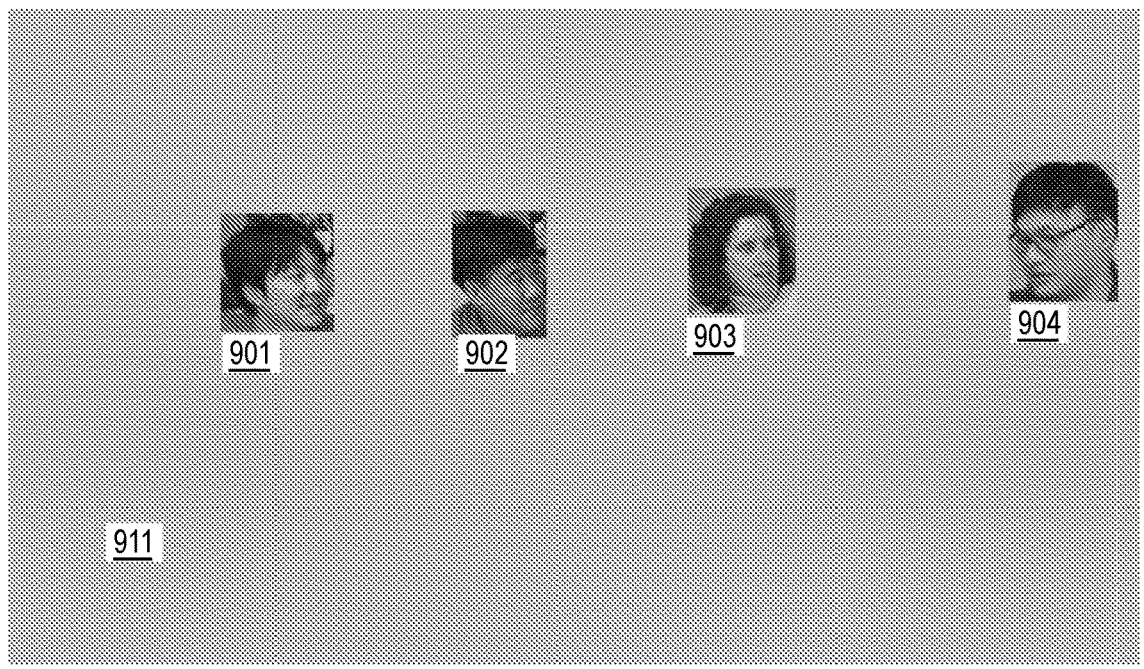
FIG. 9 illustrates an example reconstructed image or frame including only reconstructed regions of interest with the remaining reconstructed image region as a single color.

FIG. 9 illustrates an example reconstructed image or frame 900 including only reconstructed regions of interest 901, 902, 903, 904 with the remaining reconstructed image region as a single color 911, arranged in accordance with at least some implementations of the present disclosure. As shown, video decoder 122 may decode an atlas and image reconstructor 124 may reconstruct an image or frame 900 that includes patches corresponding to detected and extracted regions of interest 901, 902, 903, 904 or ROI patches with areas between such regions of interest 901, 902, 903, 904 being left as a single color such as gray. Such techniques may save bitrate and computation when the machine learning task performed by machine learning system 120 operates only on regions of interest 901, 902, 903, 904 and does not need the fully reconstructed image corresponding, for example to input image or frame 300.

In some embodiments, the full resolution image includes overlaps, in which the values of the samples of the decoded patches can either be combined with an average or weighted average or a single patch may take precedence. The precedence may be based on a signaled precedence, based on the order in which metadata for the patches is signaled, or based on a scaling factor of the patches. In some embodiments, if a downscaled version (e.g., lower resolution) of the entire image is included as a patch, the un-scaled patches (e.g., at a higher, original resolution) representing the ROIs are given precedence.

Figure 10:
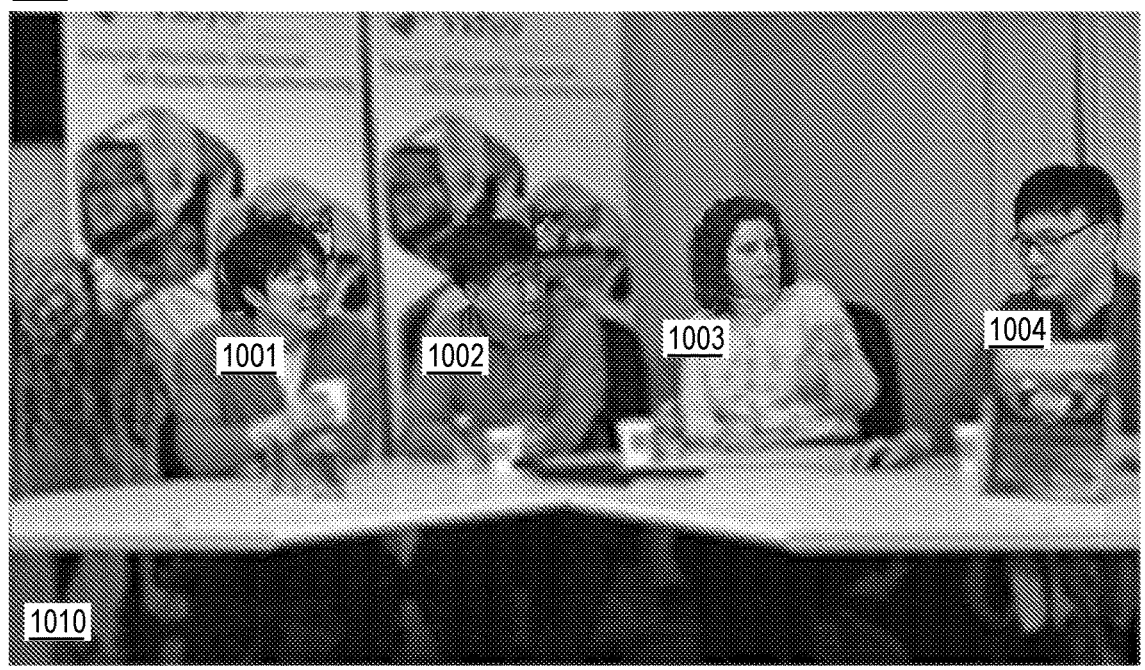
FIG. 10 illustrates an example reconstructed image or frame having regions of interest at an original size or resolution with the full reconstructed image being at a scaled, lower, resolution.

FIG. 10 illustrates an example reconstructed image or frame 1000 having regions of interest 1001, 1002, 1003, 1004 at an original size or resolution with the full reconstructed image 1010 being at a scaled, lower, resolution, arranged in accordance with at least some implementations of the present disclosure. As shown, reconstructed image 1000 is reconstructed using the full reconstructed image 1010 (e.g., the portions other than regions of interest 1001, 1002, 1003, 1004 up to a full frame size) having been downscaled and included as a patch in an atlas and the other patches (e.g., regions of interest 1001, 1002, 1003, 1004) in the atlas taking precedence during the reconstruction process. Notably, reconstructed patches or regions of interest 1001, 1002, 1003, 1004 have a higher resolution than the remainder of the full reconstructed image 1010. For example, detected and extracted patches (e.g., regions of interest 301, 302, 303, 304) may be included in an atlas at an original resolution and the full image may be downsampled or downscaled and included in the atlas as discussed with respect to FIG. 7. During reconstruction, the atlas is decoded and the frame is reconstructed with the resultant reconstructed frame 1000 being based on the downsampled or downscaled version of the full image included in the atlas and the reconstructed ROI patches at the original resolution. In some embodiments, such decode techniques may include scalable video coding as discussed with respect to FIG. 8.

In some embodiments, patches may be split into multiple atlases.

Figure 11:
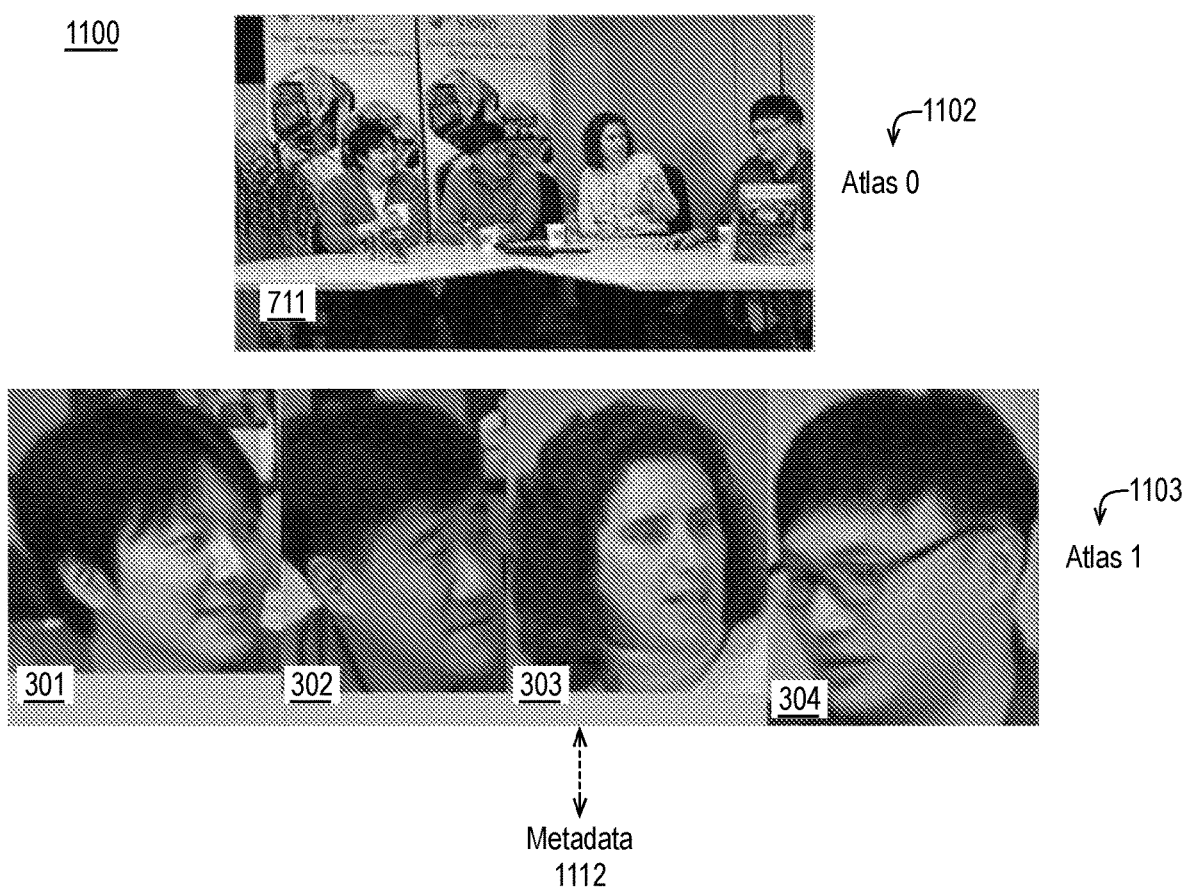
FIG. 11 illustrates exemplary first and second atlases with a first atlas including a low resolution version of an input image and a second atlas including regions of interest at full resolution.

FIG. 11 illustrates exemplary first and second atlases 1102, 1103 with first atlas 1102 including low resolution version of an input image 711 and second atlas 1103 including regions of interest 301, 302, 303, 304 at full resolution, arranged in accordance with at least some implementations of the present disclosure. As shown, including regions of interest 301, 302, 303, 304 are included in second atlas 1103 (Atlas 1) and the downscaled full image is included into first atlas 1102 (Atlas 1). In some embodiments, separate atlases such as first atlas 1102 and second atlas 1103 are coded as separate video bitstreams, providing for convenience to select to forward in a media-aware network element or select to decode at the decoder a subset of the atlases. In the example of FIG. 11, a system such as patch-based decoder 110 may select whether to decode the downscaled full image as provided in first atlas 1102 or just regions of interest 301, 302, 303, 304 as provided in second atlas 1103. As shown in FIG. 11, metadata 1112 are provided to indicate the contents of first atlas 1102 as a downscaled version of a full frame and to indicate a scaling factor, if needed, as well as to indicate the contents of second atlas 1103 as regions of interest, and to locate and size the regions of interest in a full video frame as discussed herein.

Furthermore, separation into multiple atlases may provide enhanced privacy. For example, faces may be removed from the input image and/or faces may be placed separate atlases.

Figure 12:
FIG. 12 illustrates an example atlas with region of interest patches removed

FIG. 12 illustrates an example atlas 1200 with region of interest patches 1201, 1202, 1203, 1204 removed, arranged in accordance with at least some implementations of the present disclosure. Atlas 1200 of FIG. 12 may be generated by replacing regions of interest 301, 302, 303, 304 with a solid color, for example. For example, regions of interest 301, 302, 303, 304 (e.g., the faces) may be combined together into a single separate atlas or each of regions of interest 301, 302, 303, 304 (e.g., face) may be put into its own atlas. Such separation into separate atlases provides that the video content would be represented in separate coded video sequences, which would enable separate handling (e.g. for encryption or access for privacy). In some embodiments, a codec standard may be defined such that the particular operation mode is selectable by the application. Alternatively, patches may be separated into separate tiles for the video codec. For example regions of interest 301, 302, 303, 304 may be provided in one or more separate atlases as discussed herein. At encode, a bitstream corresponding to such one or more separate atlases may be encrypted for privacy reasons. At decode, such encrypted bitstreams may be decrypted prior to decode with such decode being performed using any suitable technique or techniques discussed herein.

In some embodiments, at the encoder side, pre-processing of the patches is supported, such as edge enhancement or blurring. For example, ROI patches (e.g., faces or other objects) may be blurred or removed for privacy concerns. In some embodiments, syntax is defined to signal the type of pre-processing that has taken place, on a per patch or per atlas basis such that it may be reversed upon decode.

In some embodiments, a video encoder encoding the atlas may choose to indicate that a particular picture is marked as a long term reference picture when the arrangement of patches in the atlas changes, or changes in a significant way, such as by addition of a new patch. In some embodiments, a high level syntax element signals that the encoder will employ the long term reference picture via an indication. In some embodiments, signaling such as syntax flag(s) are used to indicate significant change(s) in arrangement of patches in the atlas. In such a system, the machine learning task on the decoder end may be advantageously simplified by only decoding long term reference pictures when operations such as classification need be performed only when significant changes have occurred. For example, simpler machine learning operations may be performed on the other pictures.

Figure 13:
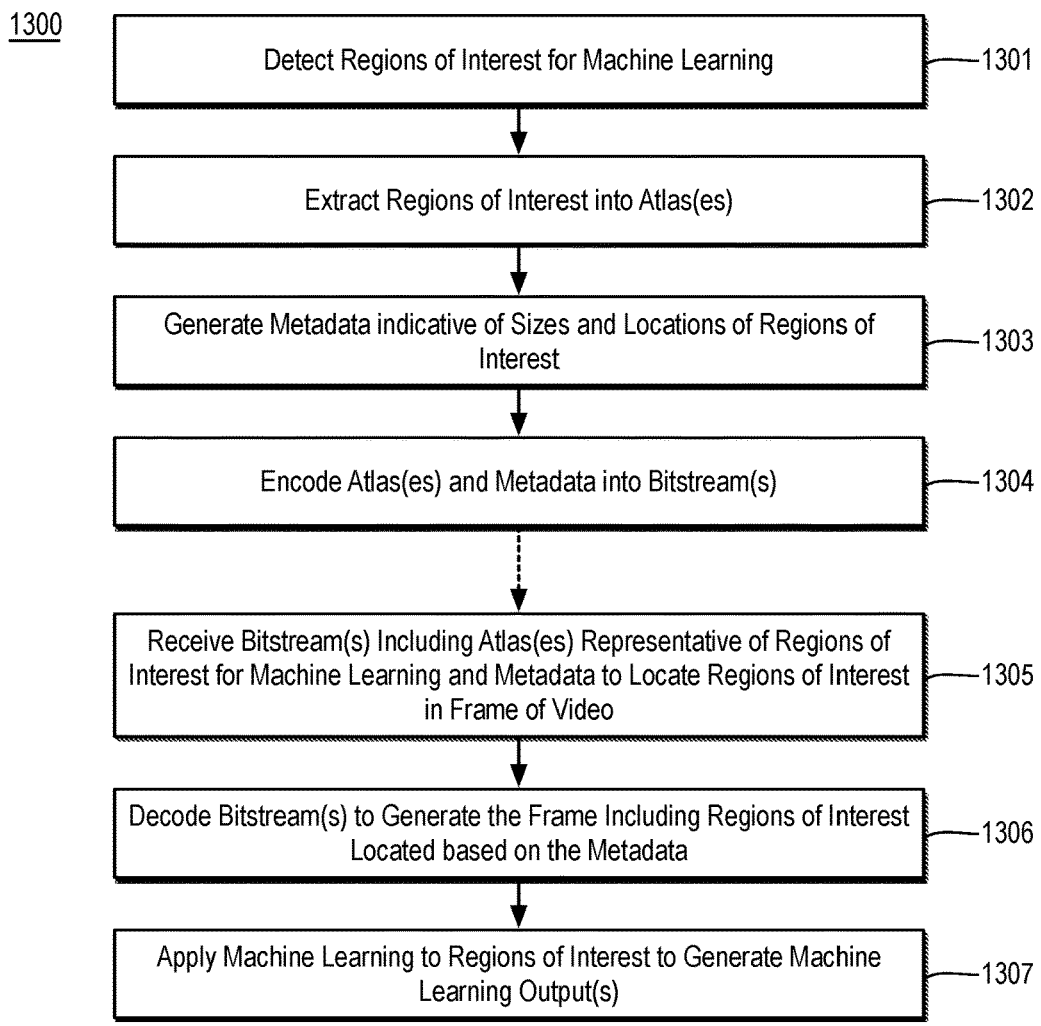
FIG. 13 is a flow diagram illustrating an example process for encoding and/or decoding video for machine learning.

FIG. 13 is a flow diagram illustrating an example process 1300 for encoding and/or decoding video for machine learning, arranged in accordance with at least some implementations of the present disclosure. Process 1300 may include one or more operations 1301-1307 as illustrated in FIG. 13. Process 1300 may form at least part of an encode process (i.e., operations 1301-1304) and/or decode process (i.e., operations 1305-1307) in the context of machine learning. Furthermore, process 1300 will be described herein with reference to system 1400 of FIG. 14.

Figure 14:
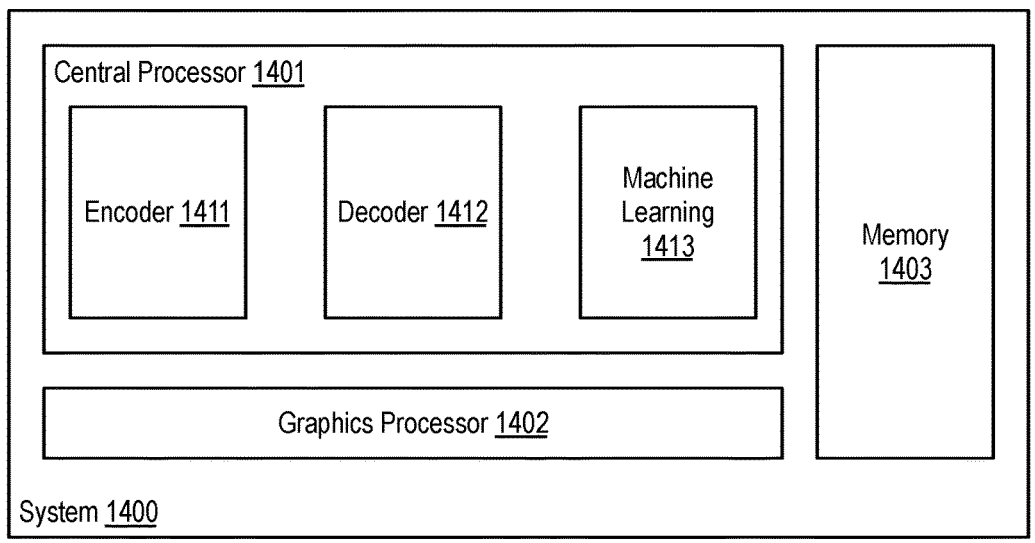
FIG. 14 is an illustrative diagram of an example system for encoding and/or decoding video for machine learning.

FIG. 14 is an illustrative diagram of an example system 1400 for encoding and/or decoding video for machine learning, arranged in accordance with at least some implementations of the present disclosure. As shown in FIG. 14, system 1400 may include a central processor 1401, a graphics processor 1402, and a memory 1403. Also as shown, central processor 1401 may implement one or more of an encoder 1411 (e.g., all or portions of patch-based encoder 100 and/or patch-based encoder 200), a decoder 1412 (e.g., all or portions of patch-based encoder 110 and/or patch-based encoder 210), and machine learning module 1413 (e.g., to implement one or both of machine learning system 120 and machine learning system 220). In the example of system 1400, memory 1403 may store bitstream data, region of interest data, downsampled frame data, metadata or any other data discussed herein.

As shown, in some examples, one or more or portions of encoder 1411, decoder 1412, and machine learning module 1413 are implemented via central processor 1401. In other examples, one or more or portions of encoder 1411, decoder 1412, and machine learning module 1413 are implemented via graphics processor 1402, a video processing unit, a vide processing pipeline, a video or image signal processor, or the like. In some examples, one or more or portions of encoder 1411, decoder 1412, and machine learning module 1413 are implemented in hardware as a system-on-a-chip (SoC). In some examples, one or more or portions of encoder 1411, decoder 1412, and machine learning module 1413 are implemented in hardware via a FPGA.

Graphics processor 1402 may include any number and type of image or graphics processing units that may provide the operations as discussed herein. Such operations may be implemented via software or hardware or a combination thereof. For example, graphics processor 1402 may include circuitry dedicated to manipulate and/or analyze video data obtained from memory 1403. Central processor 1401 may include any number and type of processing units or modules that may provide control and other high level functions for system 1400 and/or provide any operations as discussed herein. Memory 1403 may be any type of memory such as volatile memory (e.g., Static Random Access Memory (SRAM), Dynamic Random Access Memory (DRAM), etc.) or non-volatile memory (e.g., flash memory, etc.), and so forth. In a non-limiting example, memory 1403 may be implemented by cache memory. In an embodiment, one or more or portions of encoder 1411, decoder 1412, and machine learning module 1413 are implemented via an execution unit (EU) of graphics processor 1402. The EU may include, for example, programmable logic or circuitry such as a logic core or cores that may provide a wide array of programmable logic functions. In an embodiment, one or more or portions of encoder 1411, decoder 1412, and machine learning module 1413 are implemented via dedicated hardware such as fixed function circuitry or the like. Fixed function circuitry may include dedicated logic or circuitry and may provide a set of fixed function entry points that may map to the dedicated logic for a fixed purpose or function.

Returning to discussion of FIG. 13, process 1300 begins at operation 1301, where any number regions of interest for a machine learning operation are detected in a full frame of video. The regions of interest may be detected using any suitable technique or techniques pertinent to a machine learning operation to be performed on a decoder side. For example, the regions of interest may be detected using object detection techniques, face detection techniques, or the like. In some embodiments, detecting or generating a first region of interest of the regions of interest includes performing lookahead analysis to detect corresponding subsequent first regions of interest in a plurality of temporally subsequent frames relative to the full frame and sizing the first region of interest to include the first region of interest and all subsequent first regions of interest. In some embodiments, detecting or generating a first region of interest of the regions of interest includes determining a detected region around an object in the first region of interest and expanding the detected region to the first region of interest to provide a buffer around the region.

Processing continues at operation 1302, where one or more atlases comprising the regions of interest at a first resolution are formed. For example, each of the regions of interest detected at operation 1301 may be extracted from the frame and inserted into one atlas or multiple atlases. In some embodiments, no representation of the full frame of video from which the regions of interest were detected is included in the one or more atlases. In some embodiments, a lower resolution version of the full frame of vide is included in the one or more atlases. In some embodiments, process 1300 includes downscaling the full frame of video to a second resolution less than the first resolution and including the downscaled frame of video at the second resolution in the one or more atlases for encode into one or more bitstreams as discussed with respect to operation 1304.

Processing continues at operation 1303, where metadata corresponding to the one or more atlases and indicative of a size and location of each of the regions of interest in the full frame of video is generated. As discussed herein, the metadata provides a mapping between the one or more atlases and the full frame of video such that the regions of interest may be properly sized and located in the full frame of video. The metadata may include any suitable mapping data such as a location of each region of interest in the atlas, a size of each region of interest in the atlas, a location of each region of interest in the full frame, and a size of each region of interest in the full frame, or coded data from which such values may be determined. In some embodiments, the metadata includes, for a first region of interest of the regions of interest, a top left position of the first region in the full frame and a scaling factor.

Processing continues at operation 1304, where the one or more atlases and the metadata are encoded into one or more bitstreams, the one or more bitstreams absent a representation of the full frame of video at the first resolution or a resolution higher than the first resolution. For example, such extraction of regions of interest and coding at a high resolution without coding the full frame at the high resolution saves computation time and bitstream size while providing the regions of interest at high resolution for eventual use in a machine learning operation. In some embodiments, a lower resolution full frame is provided and process 1300 includes encoding a first region of interest of the plurality of regions of interest comprises scalable video encoding based on the first region of interest and a corresponding region of the full frame of video at a resolution lower than the first resolution.

In some embodiments, a first region of interest of the plurality of regions of interest is in a first atlas and process 1300 further includes detecting a second region of interest in a subsequent frame of the video resizing the first atlas and adding the second region of interest to the resized first atlas, such that encoding the one or more atlases and the metadata comprises encoding the resized first atlas. In some embodiments, a first region of interest of the regions of interest includes a representation of a face and process 1300 further includes separating the first region of interest into a first atlas and encrypting a first bitstream corresponding to the first atlas.

In some embodiments, operations 1304-1305 are performed at an encoder or encoder system and operations 1304-1305 are performed at a decoder or decoder system separate from the decoder or decoder system. For example, the one or more bitstreams may be transmitted (via any number of intermediary devices) from the encoder or encoder system to the decoder or decoder system.

Processing continues at operation 1305, where one or more bitstreams including one or more atlases representative of a plurality of regions of interest at a first resolution and metadata to locate the of regions of interest in a full frame of video are received, the one or more bitstreams absent a representation of the full frame of video at the first resolution or a resolution higher than the first resolution. As discussed such coding of regions of interest at high resolution without coding the full frame provides bit savings and efficiency while providing high quality regions of interest for machine learning operations at the decode side. The bitstream(s) may include any data discussed herein. In some embodiments, the metadata includes, for a first region of interest of the plurality of regions of interest, a top left position of the first region in the full frame and a scaling factor.

Processing continues at operation 1306, where the one or more bitstreams are decoded to generate the plurality of regions of interest. The one or more bitstreams may be decoded using any suitable technique or techniques. In some embodiments, the one or more bitstreams are standards compliant and the employed decode is also compliant to a standard codec such as AVC, HEVC, VVC, etc. In some embodiments, process 1300 further includes decoding the one or more bitstreams to generate the full frame at a second resolution less than the first resolution. In some embodiments, decoding a first region of interest of the plurality of regions of interest comprise scalable video decoding based on the first region of interest and a corresponding downscaled region of the full frame of video.

Processing continues at operation 1307, where machine learning is applied to one or more of the regions of interest based in part on corresponding one or more locations of the one or more of the regions of interest in the full frame to generate a machine learning output. The machine learning operation may be performed using any suitable technique or techniques. In some embodiments, the regions of interest include face detection regions and applying the machine learning includes applying face recognition to the one or more of the regions of interest. For the purposes of privacy, in some embodiments, a first region of interest of the regions of interest includes a representation of a face and process 1300 further includes decrypting at least a portion of the one or more bitstreams comprising a representation of the first region of interest.

Process 1300 or portions thereof may be repeated any number of times either in series or in parallel for any number of frames of video, time instances, etc. Process 1300 may be implemented by any suitable device(s), system(s), apparatus(es), or platform(s) such as those discussed herein. In an embodiment, process 1300 is implemented by a system or apparatus having a memory to store any data structure discussed herein and a processor to perform any of operations 1301-1307.

Discussion now turns to systems and devices for implementing the discussed techniques, encoders, and decoders. For example, any encoder (encoder system), decoder (decoder system), or bitstream extractor discussed herein may be implemented via the system illustrated in FIG. 15 and/or the device implemented in FIG. 16. Notably, the discussed techniques, encoder and decoders may be implemented via any suitable device or platform discussed herein such as a personal computer, a laptop computer, a tablet, a phablet, a smart phone, a digital camera, a gaming console, a wearable device, a display device, an all-in-one device, a two-in-one device, or the like.

Various components of the systems described herein may be implemented in software, firmware, and/or hardware and/or any combination thereof. For example, various components of the devices or systems discussed herein may be provided, at least in part, by hardware of a computing System-on-a-Chip (SoC) such as may be found in a computing system such as, for example, a smart phone. Those skilled in the art may recognize that systems described herein may include additional components that have not been depicted in the corresponding figures. For example, the systems discussed herein may include additional components that have not been depicted in the interest of clarity.

While implementation of the example processes discussed herein may include the undertaking of all operations shown in the order illustrated, the present disclosure is not limited in this regard and, in various examples, implementation of the example processes herein may include only a subset of the operations shown, operations performed in a different order than illustrated, or additional operations.

In addition, any one or more of the operations discussed herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more graphics processing unit(s) or processor core(s) may undertake one or more of the blocks of the example processes herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement at least portions of the devices or systems, or any other module or component as discussed herein.

As used in any implementation described herein, the term "module" refers to any combination of software logic, firmware logic, hardware logic, and/or circuitry configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, fixed function circuitry, execution unit circuitry, and/or firmware that stores instructions executed by programmable circuitry. The modules may, collectively or individually, be embodied as circuitry that forms part of a larger system, for example, an integrated circuit (IC), system on-chip (SoC), and so forth.

Figure 15:
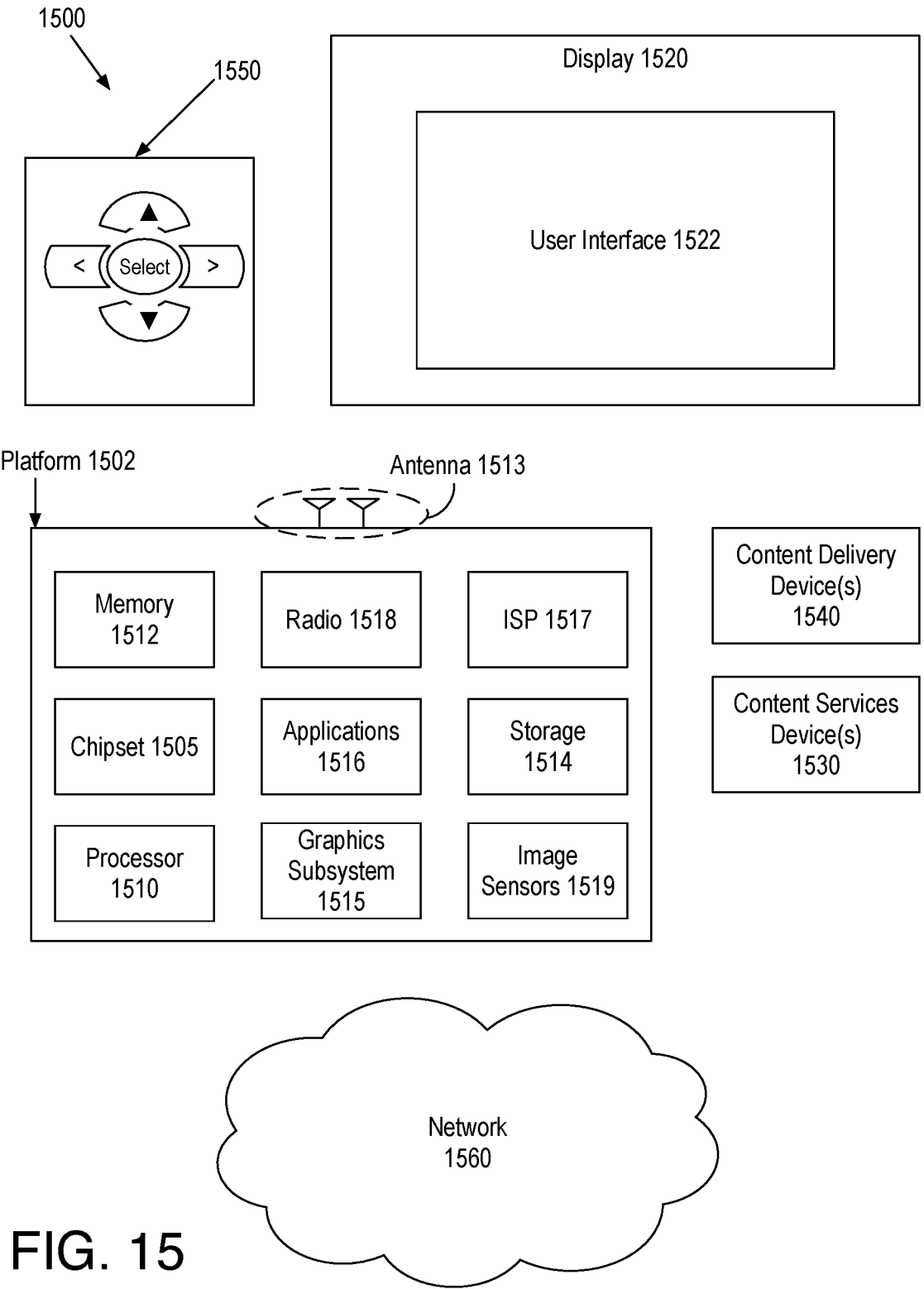
FIG. 15 is an illustrative diagram of an example system.

FIG. 15 is an illustrative diagram of an example system 1500, arranged in accordance with at least some implementations of the present disclosure. In various implementations, system 1500 may be a mobile device system although system 1500 is not limited to this context. For example, system 1500 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, cameras (e.g. point-and-shoot cameras, super-zoom cameras, digital single-lens reflex (DSLR) cameras), a surveillance camera, a surveillance system including a camera, and so forth.

In various implementations, system 1500 includes a platform 1502 coupled to a display 1520. Platform 1502 may receive content from a content device such as content services device(s) 1530 or content delivery device(s) 1540 or other content sources such as image sensors 1519. For example, platform 1502 may receive image data as discussed herein from image sensors 1519 or any other content source. A navigation controller 1550 including one or more navigation features may be used to interact with, for example, platform 1502 and/or display 1520. Each of these components is described in greater detail below.

In various implementations, platform 1502 may include any combination of a chipset 1505, processor 1510, memory 1512, antenna 1513, storage 1514, graphics subsystem 1515, applications 1516, image signal processor 1517 and/or radio 1518. Chipset 1505 may provide intercommunication among processor 1510, memory 1512, storage 1514, graphics subsystem 1515, applications 1516, image signal processor 1517 and/or radio 1518. For example, chipset 1505 may include a storage adapter (not depicted) capable of providing intercommunication with storage 1514.

Processor 1510 may be implemented as a Complex Instruction Set Computer (CISC) or Reduced Instruction Set Computer (RISC) processors, x86 instruction set compatible processors, multi-core, or any other microprocessor or central processing unit (CPU). In various implementations, processor 1510 may be dual-core processor(s), dual-core mobile processor(s), and so forth.

Memory 1512 may be implemented as a volatile memory device such as, but not limited to, a Random Access Memory (RAM), Dynamic Random Access Memory (DRAM), or Static RAM (SRAM).

Storage 1514 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 1514 may include technology to increase the storage performance enhanced protection for valuable digital media when multiple hard drives are included, for example.

Image signal processor 1517 may be implemented as a specialized digital signal processor or the like used for image processing. In some examples, image signal processor 1517 may be implemented based on a single instruction multiple data or multiple instruction multiple data architecture or the like. In some examples, image signal processor 1517 may be characterized as a media processor. As discussed herein, image signal processor 1517 may be implemented based on a system on a chip architecture and/or based on a multi-core architecture.

Graphics subsystem 1515 may perform processing of images such as still or video for display. Graphics subsystem 1515 may be a graphics processing unit (GPU) or a visual processing unit (VPU), for example. An analog or digital interface may be used to communicatively couple graphics subsystem 1515 and display 1520. For example, the interface may be any of a High-Definition Multimedia Interface, DisplayPort, wireless HDMI, and/or wireless HD compliant techniques. Graphics subsystem 1515 may be integrated into processor 1510 or chipset 1505. In some implementations, graphics subsystem 1515 may be a stand-alone device communicatively coupled to chipset 1505.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In further embodiments, the functions may be implemented in a consumer electronics device.

Radio 1518 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 1518 may operate in accordance with one or more applicable standards in any version.

In various implementations, display 1520 may include any television type monitor or display. Display 1520 may include, for example, a computer display screen, touch screen display, video monitor, television-like device, and/or a television. Display 1520 may be digital and/or analog. In various implementations, display 1520 may be a holographic display. Also, display 1520 may be a transparent surface that may receive a visual projection. Such projections may convey various forms of information, images, and/or objects. For example, such projections may be a visual overlay for a mobile augmented reality (MAR) application. Under the control of one or more software applications 1516, platform 1502 may display user interface 1522 on display 1520.

In various implementations, content services device(s) 1530 may be hosted by any national, international and/or independent service and thus accessible to platform 1502 via the Internet, for example. Content services device(s) 1530 may be coupled to platform 1502 and/or to display 1520. Platform 1502 and/or content services device(s) 1530 may be coupled to a network 1560 to communicate (e.g., send and/or receive) media information to and from network 1560. Content delivery device(s) 1540 also may be coupled to platform 1502 and/or to display 1520.

Image sensors 1519 may include any suitable image sensors that may provide image data based on a scene. For example, image sensors 1519 may include a semiconductor charge coupled device (CCD) based sensor, a complimentary metal-oxide-semiconductor (CMOS) based sensor, an N-type metal-oxide-semiconductor (NMOS) based sensor, or the like. For example, image sensors 1519 may include any device that may detect information of a scene to generate image data.

In various implementations, content services device(s) 1530 may include a cable television box, personal computer, network, telephone, Internet enabled devices or appliance capable of delivering digital information and/or content, and any other similar device capable of uni-directionally or bi-directionally communicating content between content providers and platform 1502 and/display 1520, via network 1560 or directly. It will be appreciated that the content may be communicated uni-directionally and/or bi-directionally to and from any one of the components in system 1500 and a content provider via network 1560. Examples of content may include any media information including, for example, video, music, medical and gaming information, and so forth.

Content services device(s) 1530 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 1502 may receive control signals from navigation controller 1550 having one or more navigation features. The navigation features of navigation controller 1550 may be used to interact with user interface 1522, for example. In various embodiments, navigation controller 1550 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of navigation controller 1550 may be replicated on a display (e.g., display 1520) by movements of a pointer, cursor, focus ring, or other visual indicators displayed on the display. For example, under the control of software applications 1516, the navigation features located on navigation controller 1550 may be mapped to virtual navigation features displayed on user interface 1522, for example. In various embodiments, navigation controller 1550 may not be a separate component but may be integrated into platform 1502 and/or display 1520. The present disclosure, however, is not limited to the elements or in the context shown or described herein.

In various implementations, drivers (not shown) may include technology to enable users to instantly turn on and off platform 1502 like a television with the touch of a button after initial boot-up, when enabled, for example. Program logic may allow platform 1502 to stream content to media adaptors or other content services device(s) 1530 or content delivery device(s) 1540 even when the platform is turned "off." In addition, chipset 1505 may include hardware and/or software support for 5.1 surround sound audio and/or high definition 7.1 surround sound audio, for example. Drivers may include a graphics driver for integrated graphics platforms. In various embodiments, the graphics driver may comprise a peripheral component interconnect (PCI) Express graphics card.

In various implementations, any one or more of the components shown in system 1500 may be integrated. For example, platform 1502 and content services device(s) 1530 may be integrated, or platform 1502 and content delivery device(s) 1540 may be integrated, or platform 1502, content services device(s) 1530, and content delivery device(s) 1540 may be integrated, for example. In various embodiments, platform 1502 and display 1520 may be an integrated unit. Display 1520 and content service device(s) 1530 may be integrated, or display 1520 and content delivery device(s) 1540 may be integrated, for example. These examples are not meant to limit the present disclosure.

In various embodiments, system 1500 may be implemented as a wireless system, a wired system, or a combination of both. When implemented as a wireless system, system 1500 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 1500 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 1502 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 15.

Figure 16:
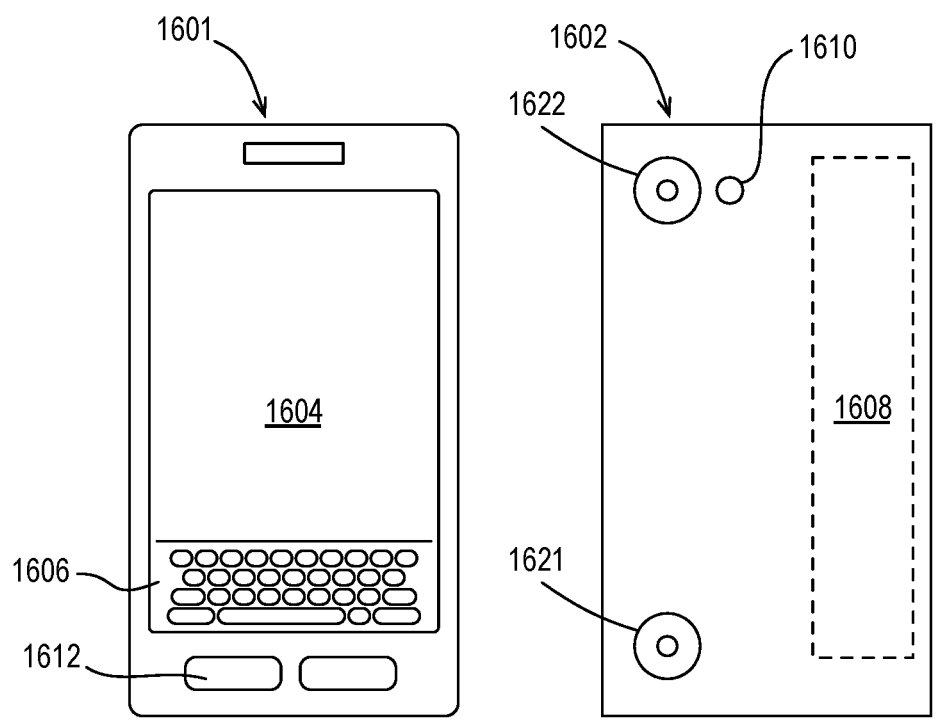
FIG. 16 illustrates an example device, all arranged in accordance with at least some implementations of the present disclosure.

As described above, system 1500 may be embodied in varying physical styles or form factors. FIG. 16 illustrates an example small form factor device 1600, arranged in accordance with at least some implementations of the present disclosure. In some examples, system 1500 may be implemented via device 1600. In other examples, other systems, components, or modules discussed herein or portions thereof may be implemented via device 1600. In various embodiments, for example, device 1600 may be implemented as a mobile computing device a having wireless capabilities. A mobile computing device may refer to any device having a processing system and a mobile power source or supply, such as one or more batteries, for example.

Examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, smart device (e.g., smartphone, smart tablet or smart mobile television), mobile internet device (MID), messaging device, data communication device, cameras (e.g. point-and-shoot cameras, super-zoom cameras, digital single-lens reflex (DSLR) cameras), and so forth.

Examples of a mobile computing device also may include computers that are arranged to be implemented by a motor vehicle or robot, or worn by a person, such as wrist computers, finger computers, ring computers, eyeglass computers, belt-clip computers, arm-band computers, shoe computers, clothing computers, and other wearable computers. In various embodiments, for example, a mobile computing device may be implemented as a smartphone capable of executing computer applications, as well as voice communications and/or data communications. Although some embodiments may be described with a mobile computing device implemented as a smartphone by way of example, it may be appreciated that other embodiments may be implemented using other wireless mobile computing devices as well. The embodiments are not limited in this context.

As shown in FIG. 16, device 1600 may include a housing with a front 1601 and a back 1602. Device 1600 includes a display 1604, an input/output (I/O) device 1606, a color camera 1621, a color camera 1622, and an integrated antenna 1608. In some embodiments, color camera 1621 and color camera 1622 attain planar images as discussed herein. In some embodiments, device 1600 does not include color camera 1621 and 1622 and device 1600 attains input image data (e.g., any input image data discussed herein) from another device. Device 1600 also may include navigation features 1612. I/O device 1606 may include any suitable I/O device for entering information into a mobile computing device. Examples for I/O device 1606 may include an alphanumeric keyboard, a numeric keypad, a touch pad, input keys, buttons, switches, microphones, speakers, voice recognition device and software, and so forth. Information also may be entered into device 1600 by way of microphone (not shown), or may be digitized by a voice recognition device. As shown, device 1600 may include color cameras 1621, 1622, and a flash 1610 integrated into back 1602 (or elsewhere) of device 1600. In other examples, color cameras 1621, 1622, and flash 1610 may be integrated into front 1601 of device 1600 or both front and back sets of cameras may be provided. Color cameras 1621, 1622 and a flash 1610 may be components of a camera module to originate color image data with IR texture correction that may be processed into an image or streaming video that is output to display 1604 and/or communicated remotely from device 1600 via antenna 1608 for example.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as IP cores may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

The following pertain to further embodiments.

In one or more first embodiments, a method for coding video for machine learning comprises detecting a plurality of regions of interest for a machine learning operation in a full frame of video, forming one or more atlases comprising the regions of interest at a first resolution, generating metadata corresponding to the one or more atlases and indicative of a size and location of each of the regions of interest in the full frame of video, and encoding the one or more atlases and the metadata into one or more bitstreams, the one or more bitstreams absent a representation of the full frame of video at the first resolution or a resolution higher than the first resolution.

In one or more second embodiments, further to the first embodiment, the method further comprises downscaling the full frame of video to a second resolution less than the first resolution and including the downscaled frame of video at the second resolution in the one or more atlases for encode into the one or more bitstreams.

In one or more third embodiments, further to the first or second embodiments, encoding a first region of interest of the plurality of regions of interest comprises scalable video encoding based on the first region of interest and a corresponding region of the full frame of video at a resolution lower than the first resolution.

In one or more fourth embodiments, further to any of the first through third embodiments, the metadata comprises, for a first region of interest of the plurality of regions of interest, a top left position of the first region in the full frame and a scaling factor.

In one or more fifth embodiments, further to any of the first through fourth embodiments, a first region of interest of the plurality of regions of interest is in a first atlas and the method further comprises detecting a second region of interest in a subsequent frame of the video and resizing the first atlas and adding the second region of interest to the resized first atlas, wherein encoding the one or more atlases and the metadata comprises encoding the resized first atlas.

In one or more sixth embodiments, further to any of the first through fifth embodiments, detecting a first region of interest of the plurality of regions of interest comprises performing lookahead analysis to detect corresponding subsequent first regions of interest in a plurality of temporally subsequent frames relative to the full frame and sizing the first region of interest to include the first region of interest and all subsequent first regions of interest.

In one or more seventh embodiments, further to any of the first through sixth embodiments, detecting a first region of interest of the plurality of regions of interest comprises determining a detected region around an object in the first region of interest and expanding the detected region to the first region of interest to provide a buffer around the region.

In one or more eighth embodiments, further to any of the first through seventh embodiments, a first region of interest of the plurality of regions of interest comprises a representation of a face, the method further comprising separating the first region of interest into a first atlas and encrypting a first bitstream corresponding to the first atlas.

In one or more ninth embodiments, a method for implementing machine learning on received video comprises receiving one or more bitstreams comprising one or more atlases representative of a plurality of regions of interest at a first resolution and metadata to locate the of regions of interest in a full frame of video, the one or more bitstreams absent a representation of the full frame of video at the first resolution or a resolution higher than the first resolution, decoding the one or more bitstreams to generate the plurality of regions of interest, and applying machine learning to one or more of the regions of interest based in part on corresponding one or more locations of the one or more of the regions of interest in the full frame to generate a machine learning output.

In one or more tenth embodiments, further to any of the first through ninth embodiments, the method further comprises decoding the one or more bitstreams to generate the full frame at a second resolution less than the first resolution, wherein decoding a first region of interest of the plurality of regions of interest comprise scalable video decoding based on the first region of interest and a corresponding downscaled region of the full frame of video.

In one or more eleventh embodiments, further to the ninth or tenth embodiments, the metadata comprises, for a first region of interest of the plurality of regions of interest, a top left position of the first region in the full frame and a scaling factor.

In one or more twelfth embodiments, further to any of the ninth through eleventh embodiments, a first region of interest of the plurality of regions of interest comprises a representation of a face, the method further comprising decrypting at least a portion of the one or more bitstreams comprising a representation of the first region of interest.

In one or more thirteenth embodiments, further to any of the ninth through twelfth embodiments, the regions of interest comprise face detection regions and applying the machine learning comprising applying face recognition to the one or more of the regions of interest.

In one or more fourteenth embodiments, a device or system includes a memory and one or more processors to perform a method according to any one of the above embodiments.

In one or more fifteenth embodiments, at least one machine readable medium includes a plurality of instructions that in response to being executed on a computing device, cause the computing device to perform a method according to any one of the above embodiments.

In one or more sixteenth embodiments, an apparatus includes means for performing a method according to any one of the above embodiments.

It will be recognized that the embodiments are not limited to the embodiments so described, but can be practiced with modification and alteration without departing from the scope of the appended claims. For example, the above embodiments may include specific combination of features. However, the above embodiments are not limited in this regard and, in various implementations, the above embodiments may include the undertaking only a subset of such features, undertaking a different order of such features, undertaking a different combination of such features, and/or undertaking additional features than those features explicitly listed. The scope of the embodiments should, therefore, be determined with reference to the appended claims, along with the full scope of equivalents to which such claims are entitled.

What is claimed is:

1. A system, comprising:
   a memory to store at least a portion of input video; and
   processor circuitry coupled to the memory, the processor circuitry to:
   detect a plurality of regions of interest for a machine learning operation in a full frame of the input video;
   form one or more atlases comprising the regions of interest at a first resolution, wherein a first region of interest of the plurality of regions of interest is in a first atlas;
   generate metadata corresponding to the one or more atlases and indicative of a size and location of each of the regions of interest in the full frame of video;
   detect a second region of interest in a subsequent frame of the input video;
   resize the first atlas and add the second region of interest to the resized first atlas; and
   encode the one or more atlases and the metadata into one or more bitstreams, the one or more bitstreams absent a representation of the full frame of video at the first resolution or a resolution higher than the first resolution, wherein the processor circuitry to encode the one or more atlases and the metadata comprises the processor circuitry to encode the resized first atlas.

2. The system of claim 1, the processor circuitry to:
   downscale the full frame of video to a downscaled frame having a second resolution less than the first resolution; and
   include the downscaled frame of video at the second resolution in the one or more atlases for encode into the one or more bitstreams.

3. The system of claim 1, wherein the processor circuitry to encode a first region of interest of the plurality of regions of interest comprises the processor circuitry to perform scalable video encode based on the first region of interest and a corresponding region of the full frame of video at a resolution lower than the first resolution.

4. The system of claim 1, wherein the metadata comprises, for a first region of interest of the plurality of regions of interest, a top left position of the first region in the full frame and a scaling factor.

5. The system of claim 1, wherein the processor circuitry to detect a first region of interest of the plurality of regions of interest comprises the processor circuitry to:

perform lookahead analysis to detect corresponding subsequent first regions of interest in a plurality of temporally subsequent frames relative to the full frame; and size the first region of interest to include the first region of interest and all subsequent first regions of interest.

6. The system of claim 1, wherein the processor circuitry to detect a first region of interest of the plurality of regions of interest comprises the processor circuitry to:
determine a detected region around an object in the first region of interest; and
expand the detected region of the first region of interest to provide a buffer around the region.

7. The system of claim 1, wherein a first region of interest of the plurality of regions of interest comprises a representation of a face, the processor circuitry to separate the first region of interest into a first atlas and encrypt a first bitstream corresponding to the first atlas.

8. At least one non-transitory machine-readable medium comprising a plurality of instructions that, in response to being executed on a computing device, cause the computing device to code video for machine learning by:
detecting a plurality of regions of interest for a machine learning operation in a full frame of video;
forming one or more atlases comprising the regions of interest at a first resolution, wherein a first region of interest of the plurality of regions of interest is in a first atlas;
generating metadata corresponding to the one or more atlases and indicative of a size and location of each of the regions of interest in the full frame of video;
detecting a second region of interest in a subsequent frame of the video;
resizing the first atlas and adding the second region of interest to the resized first atlas; and
encoding the one or more atlases and the metadata into one or more bitstreams, the one or more bitstreams absent a representation of the full frame of video at the first resolution or a resolution higher than the first resolution, wherein encoding the one or more atlases and the metadata comprises encoding the resized first atlas.

9. The non-transitory machine-readable medium of claim 8, further comprising instructions that, in response to being executed on the computing device, cause the computing device to code video for machine learning by:
downscaling the full frame of video to a downscaled frame having a second resolution less than the first resolution; and
including the downscaled frame of video at the second resolution in the one or more atlases for encode into the one or more bitstreams, wherein encoding a first region of interest of the plurality of regions of interest comprises scalable video encoding based on the first region of interest and a corresponding region of the full frame of video at a resolution lower than the first resolution.

10. The non-transitory machine-readable medium of claim 8, wherein detecting a first region of interest of the plurality of regions of interest comprises:
performing lookahead analysis to detect corresponding subsequent first regions of interest in a plurality of temporally subsequent frames relative to the full frame; and
sizing the first region of interest to include the first region of interest and all subsequent first regions of interest.

11. A system, comprising:
a memory to store at least a portion of video; and
processor circuitry coupled to the memory, the processor circuitry to:
detect a plurality of first regions of interest for machine learning operations in a full frame of the video;
form an atlas comprising the first regions of interest at a first resolution;
generate metadata corresponding to the atlas and indicative of a size and location of each of the first regions of interest in the full frame;
detect a second region of interest in a subsequent frame of the video;
resize the atlas and add the second region of interest to form a resized atlas; and
encode the resized atlas and the metadata into one or more bitstreams, the one or more bitstreams absent a representation of the full frame of video at the first resolution or a resolution higher than the first resolution.

12. The system of claim 11, the processor circuitry to:
downscale the full frame to a downscaled frame having a second resolution less than the first resolution; and
include the downscaled frame in the atlas for encode into the one or more bitstreams.

13. The system of claim 11, wherein the processor circuitry to encode at least one of the first regions of interest comprises the processor circuitry to perform scalable video encode based on the at least one of the first regions of interest and a corresponding region of the full frame at a resolution lower than the first resolution.

14. The system of claim 11, the processor circuitry to:
perform lookahead analysis to detect corresponding one or more subsequent first regions of interest in a plurality of temporally subsequent frames relative to the full frame; and
size at least one of the first regions of interest to include all subsequent first regions of interest.

15. The system of claim 11, wherein the processor circuitry to detect at least one of the first regions of interest comprises the processor circuitry to:
determine a detected region around an object in the at least one of the first regions of interest; and
expand the detected region of the at least one of the first regions of interest to provide a buffer.

16. The system of claim 11, wherein at least one of the first regions of interest comprises a representation of a face, the processor circuitry to encrypt a first bitstream corresponding to the at least one of the first regions of interest.

17. At least one non-transitory machine-readable medium comprising a plurality of instructions that, in response to being executed on a computing device, cause the computing device to code video for machine learning by:
detecting a plurality of first regions of interest for machine learning operations in a full frame of the video;
forming an atlas comprising the first regions of interest at a first resolution;
generating metadata corresponding to the atlas and indicative of a size and location of each of the first regions of interest in the full frame;
detecting a second region of interest in a subsequent frame of the video;
resizing the atlas and adding the second region of interest to form a resized atlas; and
encoding the resized atlas and the metadata into one or more bitstreams, the one or more bitstreams absent a representation of the full frame of video at the first resolution or a resolution higher than the first resolution.

18. The non-transitory machine-readable medium of claim 17, further comprising instructions that, in response to being executed on the computing device, cause the computing device to code video for machine learning by:

downscaling the full frame to a downscaled frame having a second resolution less than the first resolution; and include the downscaled frame in the atlas for encode into the one or more bitstreams.

19. The non-transitory machine-readable medium of claim 17, wherein encoding at least one of the first regions of interest comprises scalable video encoding based on the at least one of the first regions of interest and a corresponding region of the full frame at a resolution lower than the first resolution.

20. The non-transitory machine-readable medium of claim 17, further comprising instructions that, in response to being executed on the computing device, cause the computing device to code video for machine learning by:

performing lookahead analysis to detect corresponding one or more subsequent first regions of interest in a plurality of temporally subsequent frames relative to the full frame; and sizing at least one of the first regions of interest to include all subsequent first regions of interest.

21. The non-transitory machine-readable medium of claim 17, further comprising instructions that, in response to being executed on the computing device, cause the computing device to code video for machine learning by:

determining a detected region around an object in the at least one of the first regions of interest; and expanding the detected region of the at least one of the first regions of interest to provide a buffer.

22. The non-transitory machine-readable medium of claim 17, wherein at least one of the first regions of interest comprises a representation of a face, the non-transitory machine-readable medium further comprising instructions that, in response to being executed on the computing device, cause the computing device to code video for machine learning by:

encrypting a first bitstream corresponding to the at least one of the first regions of interest.

* * * * *